United States Patent
Heffington

(10) Patent No.: US 7,647,138 B2
(45) Date of Patent: Jan. 12, 2010

(54) PROGRAMMABLE AUTOMOTIVE COMPUTER SYSTEM HAVING START TIME AND WHEEL SPIN CORRECTION

(75) Inventor: Mark F. Heffington, Germantown, TN (US)

(73) Assignee: Hypertech Inc., Bartlett, TN (US)

( * ) Notice: Subject to any disclaimer, the term of this patent is extended or adjusted under 35 U.S.C. 154(b) by 0 days.

(21) Appl. No.: 11/265,707

(22) Filed: Nov. 1, 2005

(65) Prior Publication Data

US 2007/0078571 A1 Apr. 5, 2007

Related U.S. Application Data

(60) Provisional application No. 60/624,210, filed on Nov. 1, 2004.

(51) Int. Cl.
*G06F 19/00* (2006.01)
*G01M 17/00* (2006.01)
*G06F 7/00* (2006.01)
*G06F 17/00* (2006.01)
*G01P 15/00* (2006.01)

(52) U.S. Cl. .................. 701/1; 701/35; 702/85; 702/96; 73/488

(58) Field of Classification Search .......... 180/197; 701/1, 29, 33, 35; 702/1, 85, 86, 89, 96, 702/141, 142, 148; 73/1.01, 2, 1.79, 488, 73/489, 490, 503; 324/160, 162, 163
See application file for complete search history.

(56) References Cited

U.S. PATENT DOCUMENTS

| 4,003,241 A | 1/1977 | Thomas |
| 4,603,582 A | 8/1986 | Middleton |
| 4,638,289 A * | 1/1987 | Zottnik ................... 246/45 |
| 4,969,100 A * | 11/1990 | Takata et al. ............ 701/74 |
| 5,373,447 A | 12/1994 | Howes et al. |
| 5,515,281 A | 5/1996 | Palazzetti et al. |
| 5,686,651 A | 11/1997 | Hur et al. |
| 5,835,876 A | 11/1998 | Hathaway et al. |
| 6,356,823 B1 | 3/2002 | Iannotti et al. |
| 6,629,029 B1 | 9/2003 | Giles |
| 2004/0083041 A1 | 4/2004 | Skeen et al. |
| 2004/0215379 A1 | 10/2004 | Pangerl et al. |

OTHER PUBLICATIONS

Reineman, EPA, "Effictiveness of OBD II Evaporative Emission Monitors—30 Vehicle Study", EPA420-R-00-018, 23 pages, Revised Oct. 2000.

* cited by examiner

*Primary Examiner*—Edward Pipala
(74) *Attorney, Agent, or Firm*—Donald L. Bartels; Nixon Peabody LLP

(57) ABSTRACT

A system, device, and corresponding method for enabling a user to accurately control, monitor, and evaluate performance of a vehicle. A portable programmable computer device that a user can readily install by plugging it into a diagnostic connector port of the vehicle. The system includes a detector for detecting the start time of first movement of the vehicle independent of the on board diagnostic system. Velocity data from the onboard diagnostic system is time stamped by a clock in the device and stored. Velocity curves are generated from the velocity data and time stamps. Wheel spin is accounted for by smoothing the velocity curve to determine a point of inflection in the velocity indicative of termination of wheel spin and creating correcting velocity and acceleration curves by solving equations from the inflection point backwards on the curve down to time zero. From the corrected curves, an accurate distance is calculated.

19 Claims, 20 Drawing Sheets

Adjust RPM Rev Limiter

Use up and down arrows to Raise or Lower the Engine RPM Rev Limiter in 100 RPM increments. Maximum adjustment is +/- 500 RPM from stock. Press Enter to select and continue.

140

Rev Limiter = Stock

∧

∨

BACK | MAIN MENU | HELP | ENTER

FIG. 8

Adjust Electric Cooling Fans for Thermostat

Select the Thermostat that is installed in your vehicle. Electric fans will be set to come on 14 degrees above the thermostat rating and go off 5 degrees above the rating. Example: 180 T-stat Fan on/off = 194/185 deg. After making selection, press Enter to continue.

150

Stock Thermostat | 180 Thermostat | 160 Thermostat

152

BACK | MAIN MENU | HELP | ENTER

FIG. 9

Adjust Transmission Shift Points

Use up and down arrows to adjust any or all Shift Points. After making all selections, press Enter to continue.

1 - 2 Shift [Stock] [∧] [v]

2 - 3 Shift [Stock] [∧] [v]

3 - 4 Shift [Stock] [∧] [v]

[BACK] [MAIN MENU] [HELP] [ENTER]

Adjust Transmission Shift Firmness

IMPORTANT - This option can only be used with stock, un-modified transmission. DO NOT use this feature if you have installed an aftermarket shift kit or modified valve body. After making selection, press Enter to continue.

[Stock Shift Firmness] [Shift Firmness Level 1] [Shift Firmness Level 2] [Shift Firmness Level 3]

Note: Level 3 provides maximum shift firmness.

[BACK] [MAIN MENU] [HELP] [ENTER]

Select New Tire Size

Use up and down arrows to select the New Tire Size. Example: 265/75/16 or you may directly enter the tire height in inches.
After making all selections, press Enter to continue.

— 174

☐ / ☐ / ☐ OR ☐ in.

173

BACK | MAIN MENU | HELP | ENTER

Select Original Equipment Gear Ratio

Use up and down arrows to select the Gear Ratio as originally equipped.
After making selection, press Enter to continue.

— 176

Factory Gear Ratio

BACK | MAIN MENU | HELP | ENTER

FIG. 15

Return ALL Performance settings to Stock

Press Start Programming to reprogram your settings to stock. Your settings will be saved for future use.
After re-installing the HyperPAC go to Review Settings to reprogram the settings below.

Engine Power Tuning    = 87 Octane
      RPM Rev Limiter        = +200 RPM
      1 - 2 Shift               = +10 MPH
      2 - 3 Shift               = +12 MPH
      3 - 4 Shift               = Stock
      Shift Firmness         = Level 3
      Top Speed Limiter    = H-Rated 128 MPH
      Current Tire Size     = P225/50/16
      Current Gear Ratio  = Stock BACK    MAIN MENU    HELP    Start Programming

FIG. 20

Programming Error screen

NO CHANGES HAVE BEEN MADE

You have pressed the Start Programming without making any changes.

Press Make Changes to change your Performance settings or Press Back to return to the Review Performance Selection screen.

BACK    MAIN MENU    HELP    Make Changes

FIG. 21

PROGRAMMABLE AUTOMOTIVE COMPUTER SYSTEM HAVING START TIME AND WHEEL SPIN CORRECTION

CROSS REFERENCE TO RELATED APPLICATION

This application claims the benefit of U.S. Provisional Application No. 60/624,210, filed Nov. 1, 2004, which is incorporated by reference herein.

FIELD OF THE INVENTION

The invention relates in general to vehicle computer systems, and more particularly to a system, device, and corresponding method for enabling a vehicle operator to control, monitor, and evaluate vehicle performance.

BACKGROUND OF THE INVENTION

A typical automobile includes a myriad of sensors mounted around the engine and other vehicle modules for monitoring the condition and selected performance characteristics of the vehicle such as air intake, temperature, and the position and rate of change of the accelerator, etc. Typically, an engine computer, also referred to as a Powertrain Control Module (PCM), is provided in the vehicle for monitoring the sensors and providing control of various engine functions as a function of sensor data. The PCM typically makes adjustments to minimize exhaust pollution, minimize fuel consumption, and maximize engine power.

Partly in response to governmental vehicle pollution mandates, an OnBoard Diagnostics (OBD) system is typically provided in the vehicle in order to require the PCM to actively monitor and test the engine parameters and in particular, the emissions-related elements. The OnBoard Diagnostics system requires that sensors and actuators controlling pollution monitoring are checked regularly and codes generated if a fault is detected. Other diagnostic systems such as OBD-II go a step further and require the PCM to actively monitor and test the emissions-related elements. An OnBoard Diagnostic port is typically provided which enables access to the engine computer and the diagnostic codes provided by the OBD system. The diagnostic port is typically accessible from either under the hood or from the interior passenger compartment of the vehicle to facilitate monitoring and control of the vehicle's engine characteristics. Conventionally, the monitoring and troubleshooting of identified faults required the use of bulky, complex equipment that was available only at automobile repair establishments. The operation of the conventional test equipment also required the knowledge and skill of a trained mechanic.

Many vehicle operators also desire the capability to accurately control, monitor, and evaluate vehicle performance themselves without the need for bulky, complex equipment or a mechanic. The diagnosing of certain engine problems and the monitoring of certain engine performance characteristics conventionally requires the use of a dynamometer. A dynamometer or "dyno" is a device used to measure power and torque produced by the engine. There are typically two types of dynos, an engine dyno that gets bolted directly to an engine, and a chassis dyno that can measure horsepower and torque without requiring that the engine be removed from the frame of the vehicle.

A vehicle operator may also be interested in measuring the speed performance of the vehicle, e.g., quarter mile time, time to speed, and top speed. Conventionally, a drag strip or other location is used and requires another person and/or one or more external devices to monitor the vehicle position and to provide a timer for determining the quarter mile time and speed.

A vehicle operator typically also desires to have a display of vehicle operating conditions. The cost of accessory gauges to display these operating conditions, however, are often cost prohibitive and difficult to install. Vehicle operators are also typically interested in having ready access to diagnostic data and their descriptions for troubleshooting purposes.

Known devices exist for separately programming the engine functions in order to enhance vehicle performance. However, such devices are stand-alone devices that do not include the other functions.

There is therefore a need for a multipurpose system that provides a performance tuning function, a dynamometer function, and a drag strip function via a portable device that a user can readily install by plugging it into the diagnostic connector port of the vehicle. There is a need for a system that also enables a user to monitor selected characteristics of the engine and other vehicle systems.

There is a need for a system that also enables a user to selectively display diagnostic data based on data read from the onboard diagnostics system port. There is also a need for displaying vehicle operating conditions to a user without the need for costly accessory gauges.

A need also exists for providing the above features in a device that has a user friendly interface for enabling easy operation of the monitor, evaluation, and control functions.

The PCM software of the engine computer calculates the velocity data accessible from the diagnostic port based on "time between pulses" measured by a sensor on the output shaft of the transmission. The output shaft rotates at the drive shaft rotational speed such that there are one or more pulses generated every time the drive shaft turns one complete revolution. The engine computer cannot deliver the first velocity value based on time between pulses, until after the first two pulses have occurred.

In order to accurately measure the time and distance down the track from the very start, the distance and time measurements must begin simultaneously at the precise moment the vehicle moves. The time interval and the short distance traveled from "first movement" until the first pulse is not known based on any of the data available from any known diagnostic port 2. In other words, the vehicle might be at rest with the sensor on the output shaft of the transmission on the verge of "triggering", or it might be at rest with the sensor having just "triggered", or it might be anywhere in between. As a result, there is an unknown error such that any previous attempts at using PCM velocity values provided at the diagnostic port to generate distance traveled and acceleration tests have always contained an error that varies from test to test randomly, and, therefore, gives false, unreliable fluctuating results.

There is therefore a need for a detector for detecting the start time of first movement of the vehicle independent of the on board diagnostic system and its diagnostic port. A "first movement" trigger is needed such that the precise time taken to reach the first PCM delivered velocity value can be accurately determined.

The start time allows development of an accurate time line, however, the distance from first movement to the first velocity value from the diagnostic port is still unknown. Wheel spin presents another challenge because the velocity values from the diagnostic port are distorted during the time the vehicle's wheels are spinning, such that distance calculations would otherwise be inaccurate. Wheel spin of varying times and distances down the track would seem to make accuracy impossible. Conventional methods simply count off for wheel spin and do not accurately account for errors induced thereby in the velocity data.

There is therefore a need for a method that accurately and reliably accounts for the unknown distance between pulses that causes an error at the start of a test run and detects and accurately and reliably accounts for wheel spin.

SUMMARY OF THE INVENTION

The present invention provides a system, device, and corresponding method for enabling a user to control, monitor, and evaluate vehicle performance. According to one embodiment, the system includes a device having a high-resolution touch screen with a user-friendly interface including for facilitating viewing, data entry, and operation of the various modes provided. The device of the present invention installs in seconds by simply plugging its cable into the diagnostic port connector available in the interior compartment of the vehicle.

Broadly stated, the present invention provides a method for determining the time it takes for a vehicle to travel from a standing start to a selected distance, wherein the distance calculation corrects for errors in the velocity values generated by the vehicle's onboard diagnostics system, comprising the steps of detecting the start time of vehicle travel independent of the onboard diagnostics system; storing the velocity values received from the onboard diagnostics system; determining and storing for each velocity value the time period from the start time to when each velocity value is received; generating a velocity curve from said velocity values; and integrating the velocity values to calculate the time of travel from the start time to the selected distance.

Broadly stated, the present invention also provides a method for calculating distances traveled associated with driving a vehicle in a test run from a standing start over a selected distance, wherein the distance calculation corrects for velocity errors in the data obtained from the onboard diagnostics system (OBD) arising from wheel spin, including the steps of detecting the start time of first movement of vehicle in test run; reading velocity values from the OBD; time stamping said velocity values using a clock, generating a velocity curve from said velocity values and time stamps; smoothing said velocity curve so as to determine a point of inflection in the velocity indicative of a termination of wheel spin; determining elapsed time from the start time to the inflection point; and interpolating the velocity values to determine the correct distance from the start time to the inflection point.

Broadly stated, the present invention also provides a method for determining the time it takes for a vehicle to travel from a standing start to a selected distance, wherein the determination corrects for errors in the velocity values generated by the vehicle's onboard diagnostics system, wherein the errors in the velocity values include errors arising from wheel spin, comprising the steps of detecting the start time of vehicle travel independent of the onboard diagnostics system; time stamping each of the velocity values generated by the vehicle's onboard diagnostics system; determine an inflection point in the velocity values output by the onboard diagnostics system indicative of the end of the wheel spin state; determining the time that the inflection point occurs based on the time stamp of the velocity value at the inflection point; generating a velocity curve from the velocity values from the inflection point forward in time; integrating the velocity values of the generated velocity curve from the inflection point forward in time to calculate the corrected distance from the inflection point forward; interpolating the velocity values from the start time to the inflection point such that the interpolated velocity curve connects to the generated velocity curve at the inflection point; and integrating the velocity values of the interpolated velocity curve to calculate the corrected distance from the start time to the inflection point.

Broadly stated, the present invention also provides an electronic portable device for determining the time it takes for a vehicle to travel from a standing start to a selected distance, wherein the device's distance calculation corrects for errors in the velocity values generated by the vehicle's onboard diagnostics system, comprising an input/output port for coupling said device to said diagnostic port for accessing the onboard diagnostic system and the engine computer; a detector for detecting the start time of vehicle travel independent of the onboard diagnostics system; a microcontroller operative for determining for each velocity value the time period from the start time to when each velocity value is received, for generating a velocity curve from said velocity values; and for integrating the velocity values to calculate the time of travel from the start time to the selected distance; a memory for providing storage in said device for velocity values received from the onboard diagnostics system and providing storage in said device, for each velocity value, the time period from the start time to when each velocity value is received; and a touch screen display for enabling user selection of said operations of said device.

An advantage of the present invention is that it provides a touch screen user interface including an easy-to-use menu interface, a typewriter-style keyboard enabling easy data entry, and contextual help screens to facilitate use and eliminate the need for a separate user manual.

Another advantage of the present invention is that it provides a detector for detecting the start time of first movement of the vehicle independent of the on board diagnostic system and its diagnostic port.

Another advantage of the present invention is that it provides a method that accurately and reliably accounts for the unknown distance between pulses that causes an error at the start of a test run and detects and accurately and reliably accounts for wheel spin.

An advantage of the present invention is that it enables performance tuning by a user. The present invention enables a user to unlock the performance potential of computer-controlled vehicle engines by providing optimized fuel and ignition curves for enabling improved engine performance over the entire revolutions per minute (RPM) range. The present invention also gives a performance enthusiast and other users the ability to reprogram and personalize the onboard computer that controls virtually all aspects of the vehicle's operation. For example, the system enables adjustment of the engine RPM limiter for faster acceleration and adjustment of the top speed limiter for matching the speed rating of factory-approved tires. According to another aspect, the system enables correction of speedometer/odometer readings for non-stock tire sizes and gear ratios. The present invention, according to another aspect, enables a user to change the automatic transmission shift points and shift firmness to improve performance and enables adjustment of the on-off temperature of the vehicle's electric cooling fan. The present invention enables storage of the stock tuning calibrations in the memory of the device so that these calibrations can be selectively restored by a user.

Another advantage of the present invention is that it provides a drag strip function, i.e., a virtual drag strip, for accurately recording acceleration data, elapsed times and speeds during a test run, and for presenting the results of the test run to a user in a time slip format. The present invention, according to other aspects, also records and displays reaction time, incremental elapsed times and speed over several distances, time to speeds, e.g., 0-60 mph, 0-100 mph, and time to maximum speed. The present invention provides the vehicle performance information without the cost and inconvenience of using complex and expensive track testing equipment at a commercial drag strip.

Another advantage of the present invention is that is provides a dynamometer function for generating accurate horsepower and torque graphs under real-world conditions. The dynamometer function is also referred to herein as the dyno function or "dyno shop" function. A related advantage of the present invention is that it enables accounting for the aerodynamic drag and rolling resistance values for a specific vehicle, even if the vehicle includes one or more non-stock modifications. According to another aspect, correction for temperature and humidity is provided for increased accuracy and repeatability.

Another advantage of the present invention is that it provides user-selectable graphic display of vehicle operating conditions without the need for accessory gauges. The present invention enables the monitoring of various functions such as oil pressure, engine coolant temperature, exhaust gas temperatures, fuel flow, spark timing, turbo boost, fuel mileage, and others.

Another advantage of the present invention is that it provides for the identification and display of Diagnostic Trouble Codes (DTC's) with informative text descriptions so as to eliminate the need to look up a code number to determine a fault. Another advantage of the present invention is that it enables the clearing of selected DTCs without requiring expensive customized equipment for that purpose.

Another advantage of the present invention is that it provides a device that includes an optional Universal Serial Bus (USB) Port to personal computer (PC) interface to enable connectivity for future expansion modules, e.g., for facilitating the downloading, printing and sharing of data from the device.

Another advantage of the present invention is that it provides an interface port having a connector for accessing data on powertrain and vehicle operating conditions in real time with easy installation without tools and can be used with any OBD II compliant vehicle. Vehicle manufacturers in the United States were required to provide an OBD II compliant port starting with the 1996 model year. Some newer vehicles, i.e., post-2003, also support a Controller Area Network (CAN) bus that is typically accessible via the OBD-II connector. An embodiment according to the present invention provides support for the CAN bus to enable additional future configurability and expandability.

Another advantage of the present invention is that it provides data acquisition features to enable a user to store and retrieve drag strip, dyno, and engine monitoring data, allows run-to-run comparisons to evaluate changes, stores data by date and session for easy retrieval, and facilitates data sharing with a PC and via the Internet.

Another advantage of the present invention is that it enables dual fuel capability for a user, in that it enables an engine to be tuned to deliver virtually the same power increases with regular octane gasoline as with premium octane gasoline in engines designed for regular fuel. The dual fuel capability aspect of the present invention has the advantages of enabling a user to get maximum power and performance with significant cost savings by enabling the use of less expensive regular fuel while producing more power than with either stock tuning or prior art "dual fuel" tuning which produces no gains with regular gasoline.

Another advantage of the present invention is that it provides a 3-Stage Tuning for diesel engines so as to enable a user to select the horsepower increase to suit his or her driving style. According to anther aspect, the present invention has an advantage of enabling tuning of the vehicle to its maximum power so as to provide improved towing capability up to the vehicle's maximum weight rating while also enabling potential gains in fuel economy.

These and other embodiments, features, aspects, and advantages of the invention will become better understood with reference to the following description, appended claims and accompanying drawings.

BRIEF DESCRIPTION OF THE DRAWINGS

FIG. 8 shows an exemplary "adjust RPM rev limiter" menu displayed on the touch screen of the device in FIGS. 1 and 2 in response to selection of the "adjust RPM rev limiter" button of FIG. 4;

FIG. 9 shows an exemplary "adjust electric cooling fans for thermostat" menu displayed on the touch screen of the device in FIGS. 1 and 2 in response to selection of the "adjust electric cooling fans" button of FIG. 4;

FIG. 10 shows an exemplary "adjust transmission shift points" menu displayed on the touch screen of the device in FIGS. 1 and 2 in response to selection of the "adjust transmission shift points" button of FIG. 4;

FIG. 11 shows an exemplary "adjust transmission shift firmness" menu 162 displayed on the touch screen 12 of the device 10 in response to selection of the enter button 152 of FIG. 9;

FIG. 14 shows an exemplary "select new tire size" menu displayed on the touch screen of the device in FIGS. 1 and 2 in response to the user selection of the "enter" button on FIG. 13;

FIG. 15 shows an exemplary "select original equipment gear ratio" menu displayed on the touch screen of the device in FIGS. 1 and 2 if one of the selections in FIG. 12 for correcting gear is selected;

FIG. 20 shows an exemplary "return all performance settings to stock" menu displayed on the touch screen of the device in FIGS. 1 and 2 in response to selection of the "return all setting to stock" button of FIG. 4;

FIG. 21 shows an exemplary "programming error screen" menu displayed on the touch screen of the device in FIGS. 1 and 2 in response to selection of a start programming button for initiating programming without any changes having been made;

Reference symbols or names are used in the Figures to indicate certain components, aspects or features shown therein, with reference symbols common to more than one Figure indicating like components, aspects or features shown therein.

DETAILED DESCRIPTION OF THE INVENTION

Figure 1:
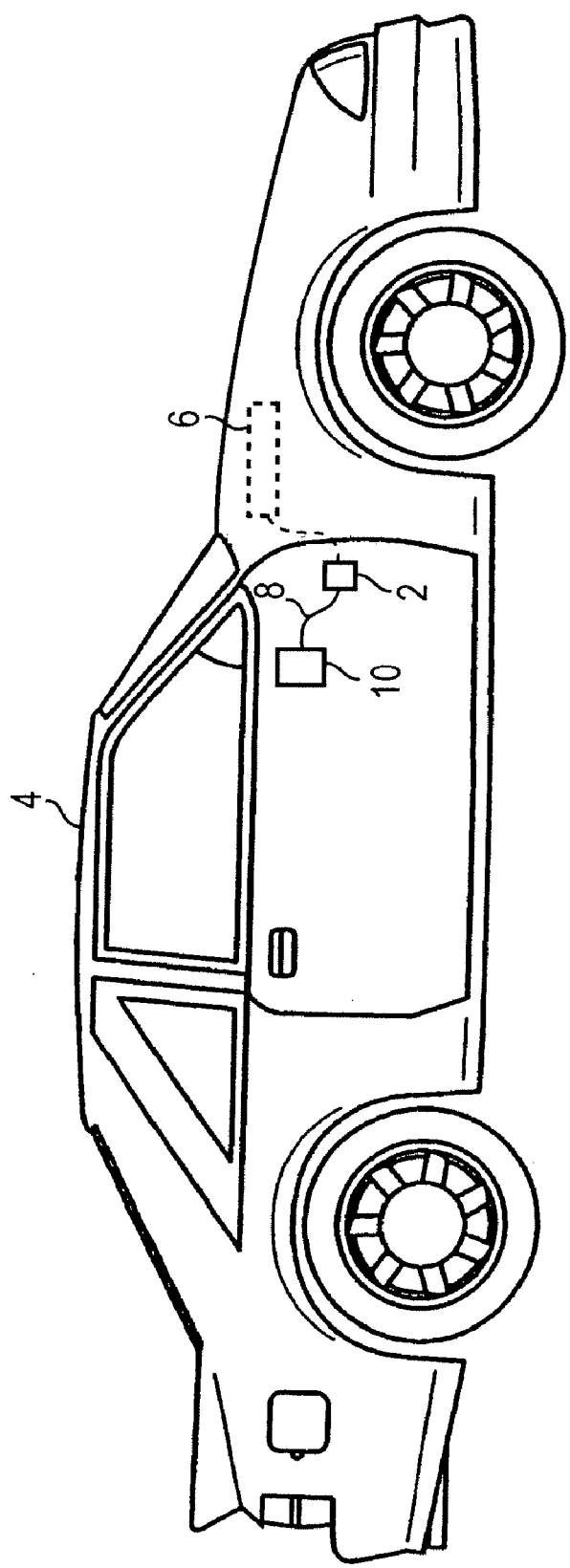
FIG. 1 illustrates a device and system according to an embodiment of the present invention connected to a diagnostics port coupled to an engine computer within an automobile.

The system of the present invention includes a portable programmable automotive computer. FIG. 1 is an illustration of an automobile 4 having an automotive computer 6, also referred to as a Powertrain Control Module (PCM), for controlling the operation thereof. Automotive computer 6 is coupled to an onboard diagnostic port 2, e.g., an OBD II port, accessible from the interior compartment of the automobile 4 as shown. Although automobile 4 is shown as a car, the present invention is for use on other vehicles including trucks, Sports Utility Vehicles (SUVs), and hot rods. The diagnostic port 2 provides access to the PCM and provides engine characteristics and diagnostic codes information. A portable programmable automotive computer device 10 according to the present invention is coupled to diagnostic port 2. The programmable automotive computer device 10 is preferably coupled to the diagnostic port 2 via a cable 8 as shown in the embodiment in FIG. 1. It should be appreciated that other suitable coupling devices may also be used to practice the invention, e.g., a wireless connection. Device 10 preferably includes a housing that includes an on/off button (not shown).

Figure 2:
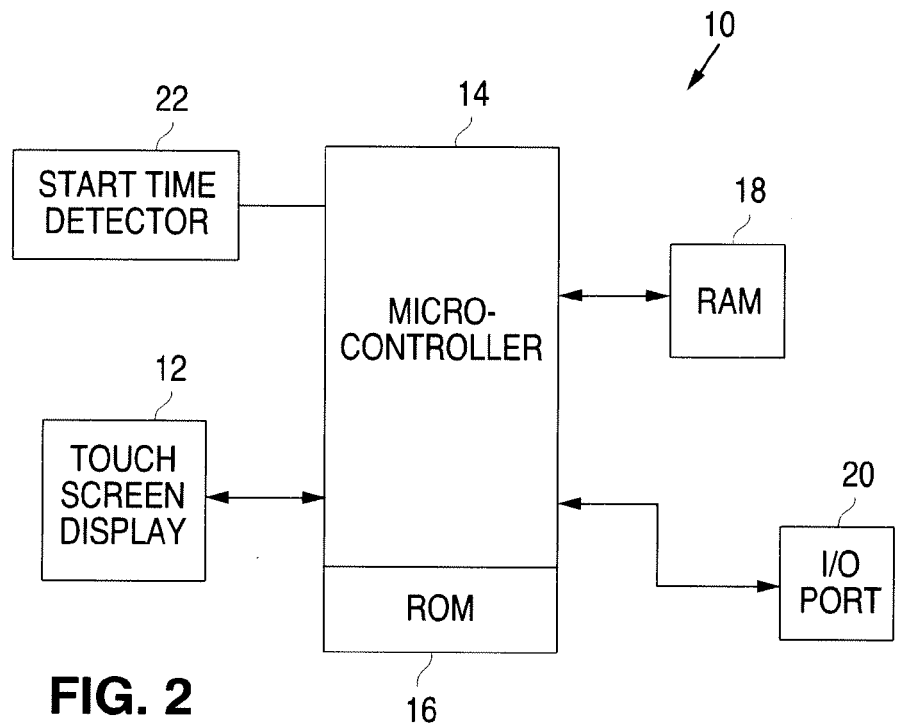
FIG. 2 is a schematic diagram of the device according to an embodiment of the present invention.

FIG. 2 is a schematic block diagram of the programmable automotive computer device 10 according to an embodiment of the present invention. Device 10 includes a touch screen display 12, a microcontroller 14, microcontroller ROM memory 16, RAM memory 18 and an I/O port 20. According to a preferred embodiment, touch screen display 12 is a high resolution 2"×4" blue Liquid Crystal Display (LCD) touch screen. The I/O port 20 of device 10 enables connection to the diagnostic port 2 shown in FIG. 1. The device 10 is portable and preferably remains plugged into the diagnostic port 2 for active operation. The system enables a user to selectively execute a selected one of a plurality of programs installed in device 10. The device 10 preferably provides five user-selectable programs referred to herein as Power Tuning, Dynamometer, Drag Strip, Diagnostics, and Engine Monitor.

The system also alternatively includes a start time detector 22 as shown in FIG. 2, for detecting the start time of vehicle travel independent of the onboard diagnostic system, e.g. as function of detection of the first movement of the vehicle.

The device 10 according to the present invention includes an operating system which allows additional programs to be installed. According to an alternative embodiment, the device 10 includes an additional port, e.g., a Universal Serial Bus (USB) Port, (not shown) to enable connection to a PC or a network such as the Internet to enable transfer of saved dyno, dragstrip, or diagnostic test information for printing, additional analysis, or other use. According to an alternative embodiment, software is provided to enable this additional analysis. The device 10 also includes expansion capability for installation of additional circuitry for providing additional capability. For example, an embodiment of the device according to the present invention provides support for the Controller Area Network (CAN) bus to enable additional future configurability and expandability.

Device 10 is designed to receive a myriad of inputs from the automotive computer 6 via the diagnostic port 2, internally and transparent to the user. For instance, if the PCM contains the vehicle identification number (VIN), it is received by the device 10 automatically and is displayable. The user is prompted to enter the VIN for vehicles that do not automatically provide access to it at the diagnostic port.

The device 10 enables the user to selectively enter a "setup mode" (not shown). The "setup" mode is provided for enabling the user to enter data to appear on predetermined screens and on printouts, e.g., user name, car specifications, etc. Once the "set up" mode is complete, the present invention will cause the data to be shown at the predetermined areas on the display or on a print-out, until the data is changed. The device 10 preferably enables the user to selectively receive additional explanations and expanded "how to" information preferably via a "More Info" or a "Help" button specific to the displayed screen.

Figure 3:
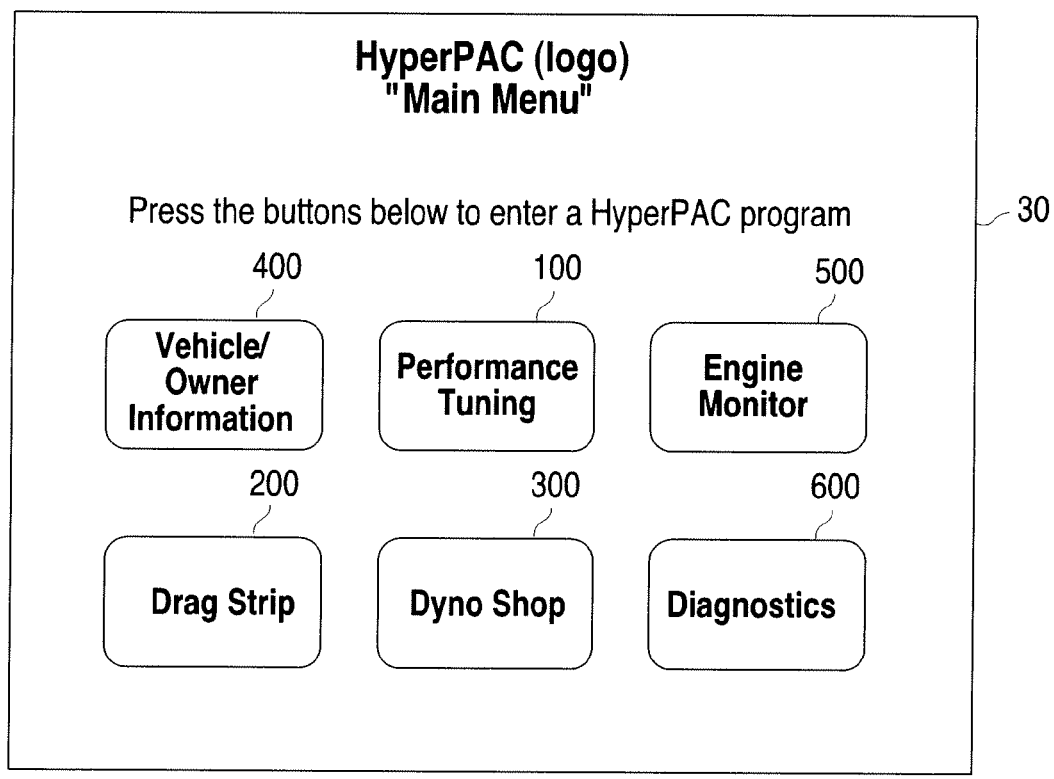
FIG. 3 shows an exemplary main menu display screen of the device for prompting the user to select one of the provided program functions according to an embodiment of the present invention.

FIGS. 3-38 illustrate exemplary screens for display on the touch screen 12 of device 10. It should be appreciated that the screens are exemplary only. FIG. 3 shows an exemplary main menu 30 displayed on the touch screen 12 of the device 10 which prompts the user to select one of the provided program functions. The program functions selectable via buttons on the touch screen from the main menu as seen in the example in FIG. 3 include performance tuning, drag strip, dyno shop, vehicle/owner information, engine monitor, and diagnostics. Screen 30 as seen in FIG. 3 displays a performance tuning button 100, drag strip button 200, dyno shop button 300, vehicle/owner information button 400, engine monitor, button 500, and diagnostics button 600 for selecting the corresponding program. The program functions are also referred to herein as programs or modes.

The Performance Tuning program, also referred to herein as the Power Tuning program, enables a user to reprogram and personalize the engine computer that controls nearly all aspects of vehicle operation. For example, the present invention enables the adjustment of the engine rpm limiter for faster acceleration and enables adjusting the top speed limiter to match the speed rating of factory-approved tires. The Performance Tuning program enables, in addition, correction of the speedometer/odometer readings to account for non-stock tire sizes and gear ratios, and adjustment of the automatic transmission shift firmness to improve acceleration and extend transmission life. The Performance Tuning program of device 10 also enables a user to change the automatic transmission shift points to improve performance and enables adjustment of the electric cooling fan on-off temperature to increase power and prevent destructive detonation. The device 10 stores the stock tuning calibration settings in its memory for enabling a user to selectively restore the settings. FIGS. 4-22 show exemplary screens displayed by the device of FIGS. 1 and 2 for the performance tuning program.

Figure 4:
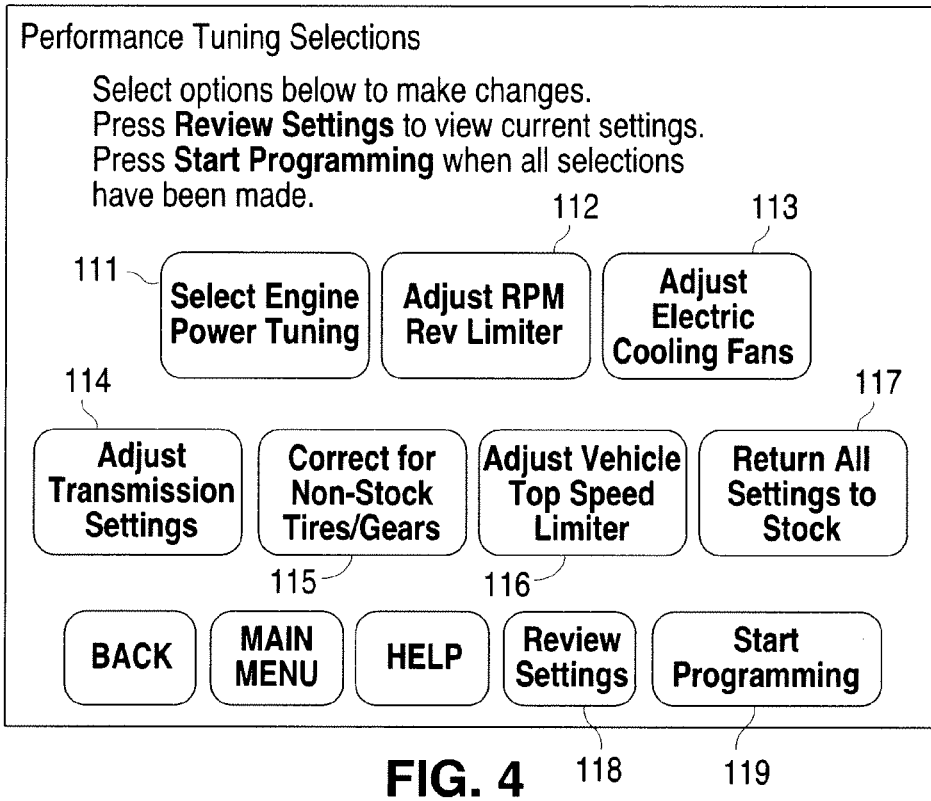
FIG. 4 shows an exemplary performance tuning selections menu displayed on the touch screen of the device in FIGS. 1 and 2 in response to selection of the Performance Tuning program shown in FIG. 3 according to an embodiment of the present invention.
Figure 5:
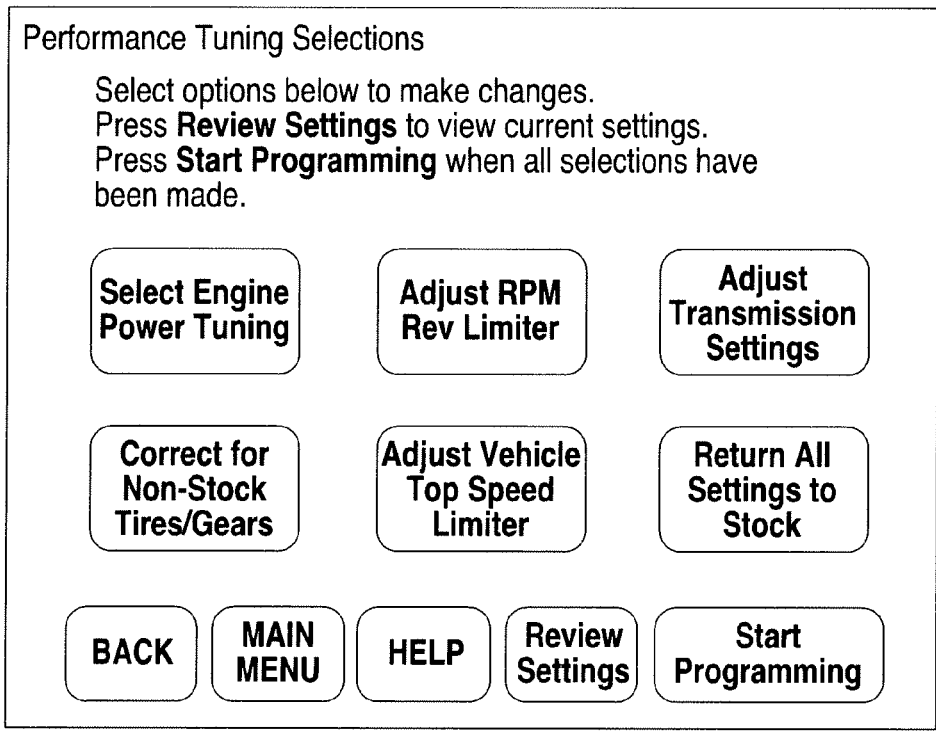
FIG. 5 shows an exemplary performance tuning selections menu displayed on the touch screen of the device in FIGS. 1 and 2 in response to selection of the Performance Tuning program for vehicles without cooling fans according to an embodiment of the present invention.

FIG. 4 shows an exemplary performance tuning selections menu 110 displayed on the touch screen 12 of the device 10 in response to selection of the Performance Tuning program 100 shown in FIG. 3. As seen in FIG. 4, the menu 110 displays a plurality of user selectable "buttons" including a button 113 indicating "adjust electric cooling fans". Most trucks do not have electric cooling fans. FIG. 5 shows an exemplary performance tuning selections menu 120 displayed on the touch screen 12 of the device 10 in response to selection of the Performance Tuning program 100 for vehicles without cooling fans. It should be appreciated that the screens are exemplary and will vary, for example, depending on whether used with gasoline or diesel vehicles.

Regarding general navigation buttons included throughout the exemplary screens, the "back" button is preferably provided to return the user to the previously viewed screen, the "main menu" button is preferably provided to return the user to the Main Menu screen corresponding to the current program/mode. The "help" button is preferably provided to enable display of a help screen for providing help information for the current screen and a "close" button is preferably provided for closing the help screen. In the example in FIG. 6, the "enter" button is provided to enable recording of the selection and returns the user to the corresponding Performance Tuning Selections screen 110 or 120.

Figure 6:
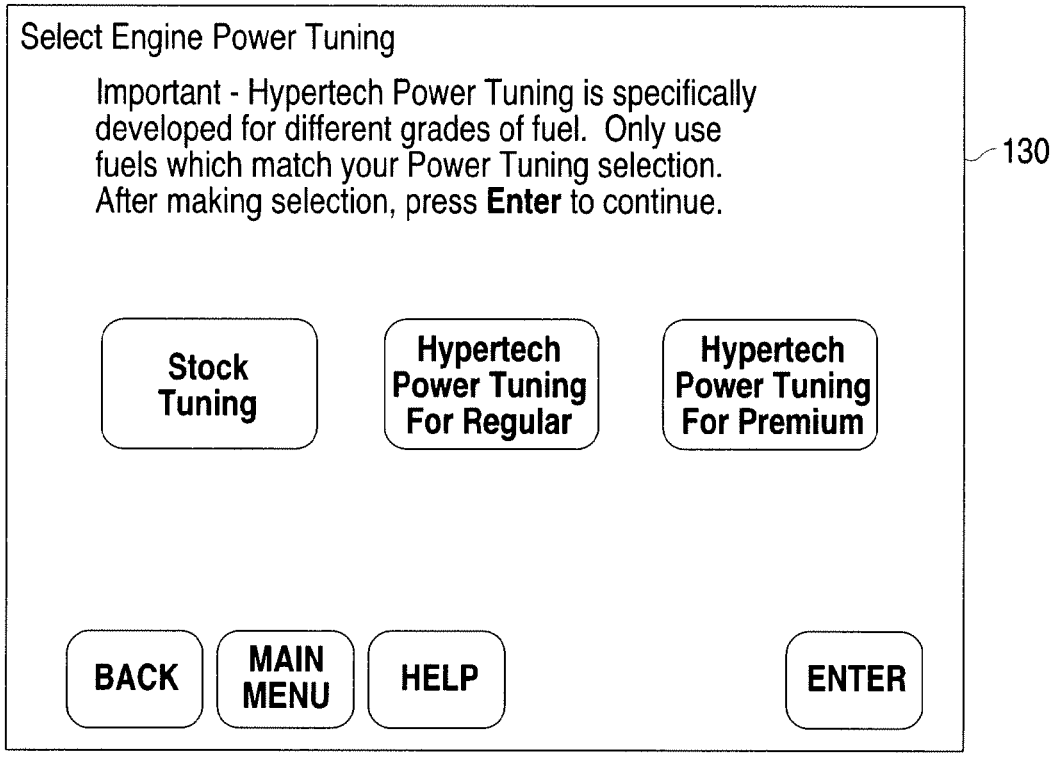
FIG. 6 shows an exemplary "select engine power tuning" menu for gasoline applications that is displayed on the touch screen of the device in FIGS. 1 and 2 in response to selection of the "select engine power tuning" button of FIG. 4.
Figure 7:
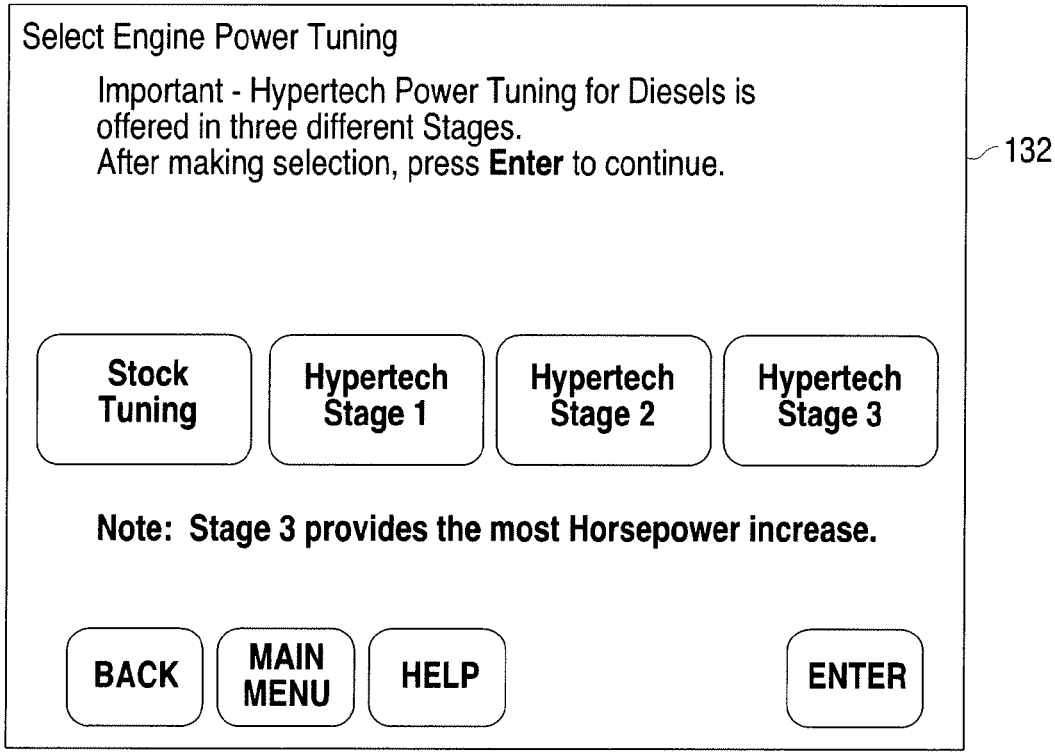
FIG. 7 shows an exemplary "select engine power tuning" menu for use with diesel fuel vehicles.

It should be appreciated that the screens are exemplary. For example, the Engine Tuning Screens will vary depending on gasoline or diesel applications. FIG. 6 shows an exemplary "select engine power tuning" menu 130 for gasoline applications that is displayed on the touch screen 12 of the device 10 in response to selection of the "select engine power tuning" button 111 of FIG. 4. The exemplary "select engine power tuning" menu 132 for use with diesel fuel vehicles is shown in FIG. 7.

FIG. 8 shows an exemplary "adjust RPM rev limiter" menu 140 displayed on the touch screen 12 of the device 10 in response to selection of the "adjust RPM rev limiter" button 112 of FIG. 4. FIG. 9 shows an exemplary "adjust electric cooling fans for thermostat" menu 150 displayed on the touch screen 12 of the device 10 in response to selection of the "adjust electric cooling fans" button 113 of FIG. 4.

FIG. 10 shows an exemplary "adjust transmission shift points" menu 160 displayed on the touch screen 12 of the device 10 in response to selection of the "adjust transmission shift points" button 114 of FIG. 4. FIG. 11 shows an exemplary "adjust transmission shift firmness" menu 162 displayed on the touch screen 12 of the device 10 in response to selection of the enter button 152 of FIG. 9.

Figure 12:
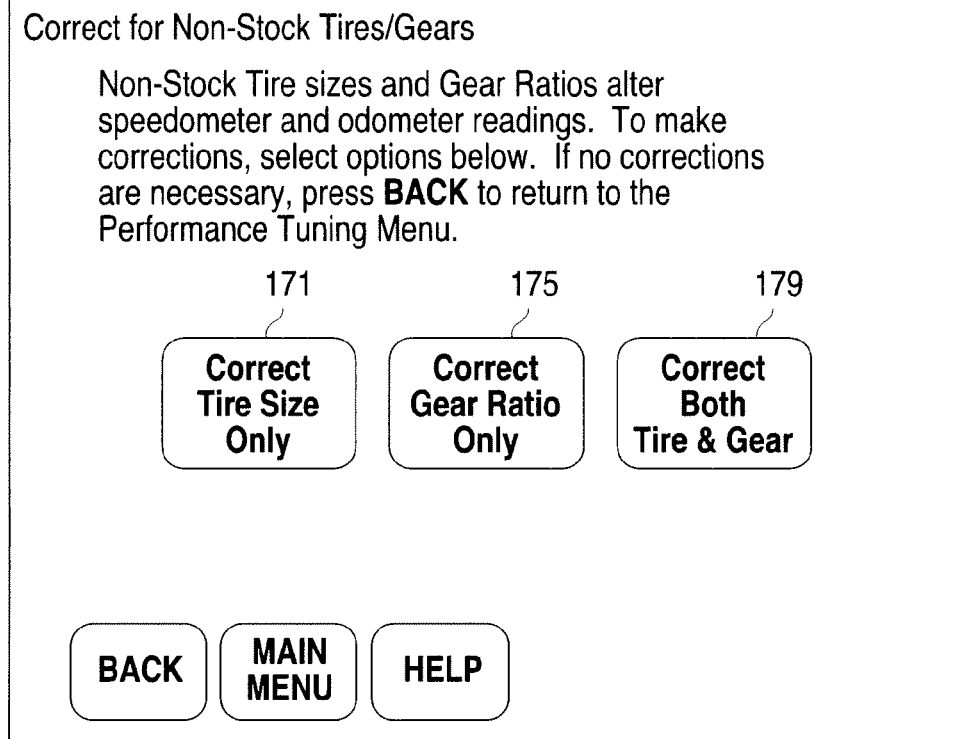
FIG. 12 shows an exemplary "correct for non-stock tires/gears" menu displayed on the touch screen of the device in FIGS. 1 and 2 in response to selection of the "correct for non-stock tires/gears" button of FIG. 4.

FIG. 12 shows an exemplary "correct for non-stock tires/gears" menu 170 displayed on the touch screen 12 of the device 10 in response to selection of the "correct for non-stock tires/gears" button 115 of FIG. 4. In response to selection of the "correct tire size only" button 171, after the tire size selection in made, as seen in FIGS. 13 and 14, the user is returned to the performance tuning selection screen 110 of FIG. 4.

Figure 16:
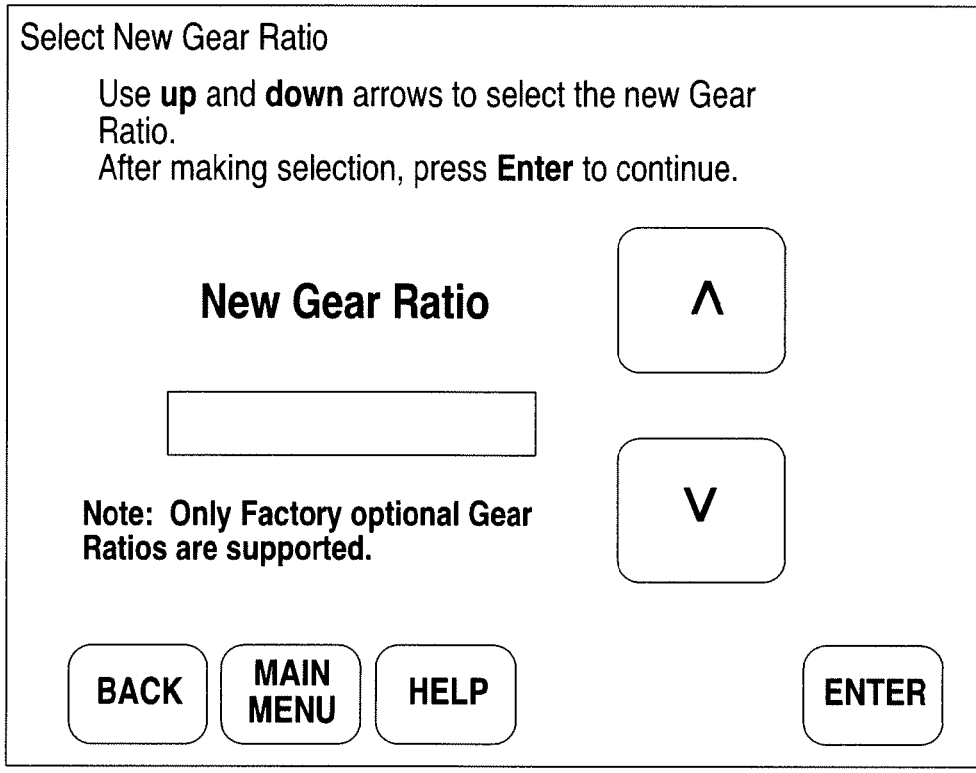
FIG. 16 shows an exemplary "select new gear ratio" menu displayed on the touch screen of the device in FIGS. 1 and 2 in response to the user selection of the "enter" button on FIG. 15.

In response to selection of the "correct gear ratio only" button 176, after the gear ratio selection in made, as seen in FIGS. 15 and 16, the user is returned to the performance tuning selection screen 110 of FIG. 4. Selection of the "correct both tire & gear" button 179 of FIG. 12 causes the user to be returned to the performance tuning selection screen 110 of FIG. 4 after selection of both the tire size and gear ratio.

Figure 13:
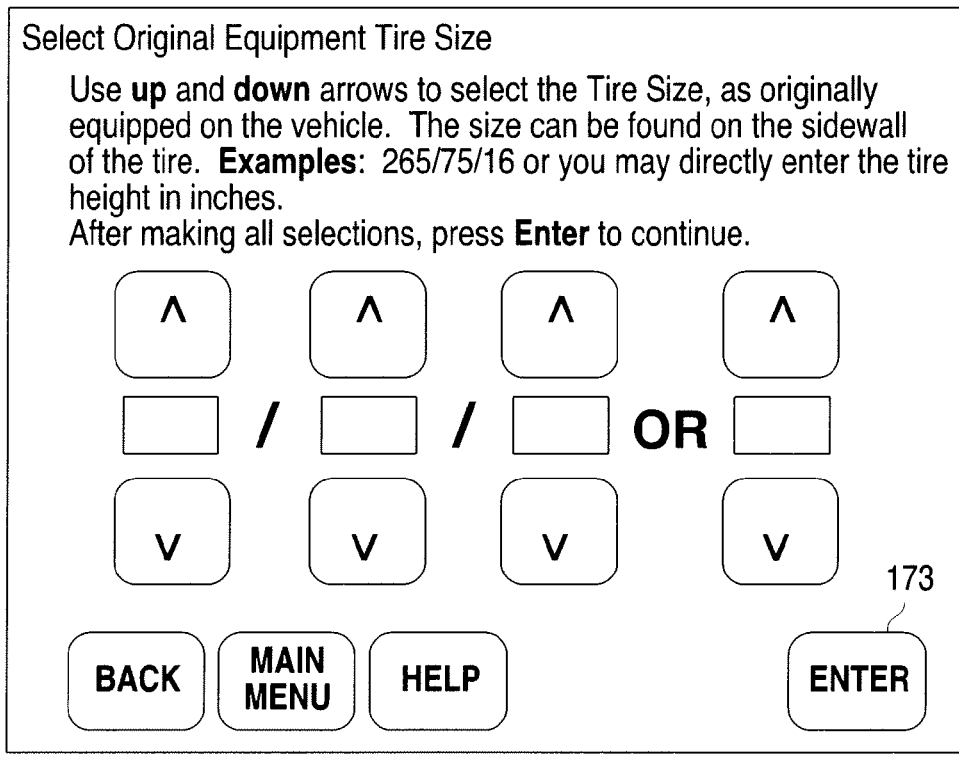
FIG. 13 shows an exemplary "select original equipment tire size" menu displayed on the touch screen of the device in FIGS. 1 and 2 if one of the selections on FIG. 12 for correcting tires is selected.

FIG. 13 shows an exemplary "select original equipment tire size" menu 172 displayed on the touch screen 12 of the device 10 if one of the selections on FIG. 12 for correcting tires is selected. In response to the user selection of the "enter" button 173 on FIG. 13, the "select new tire size" menu 174 of FIG. 14 is presented.

FIG. 15 shows an exemplary "select original equipment gear ratio" menu 176 displayed on the touch screen 12 of the device 10 if one of the selections on FIG. 12 for correcting gear is selected. In response to the user selection of the "enter" button 177 on FIG. 15, the "select new gear ratio" menu 178 of FIG. 16 is presented.

Figure 17:
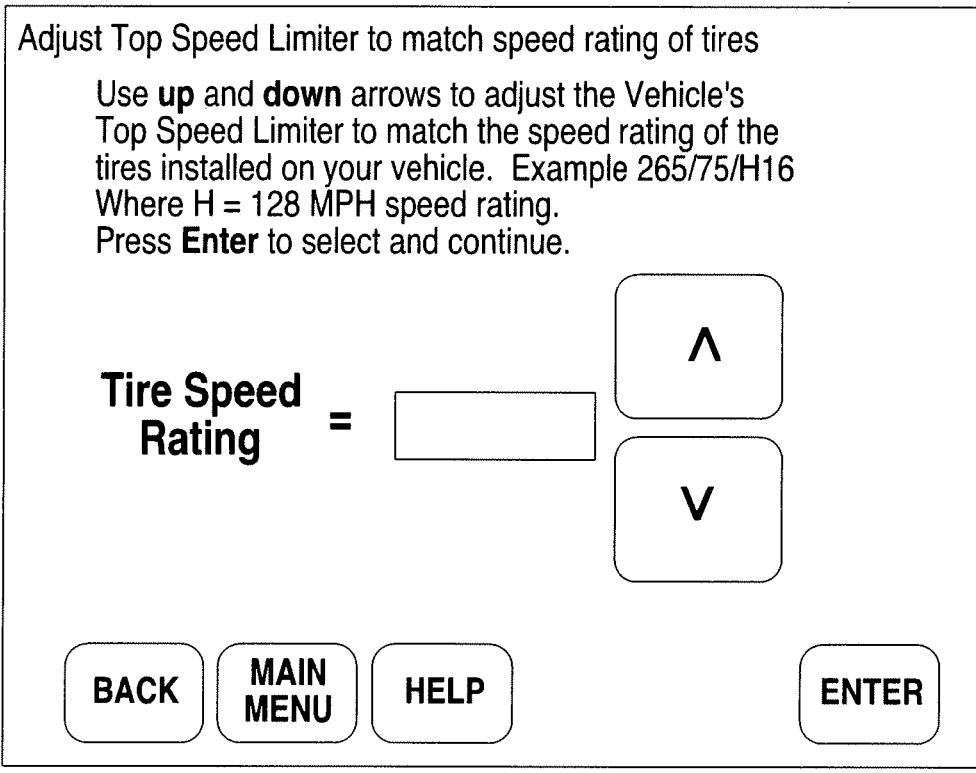
FIG. 17 shows an exemplary. "adjust top speed limiter to match speed ratings of tires" menu displayed on the touch screen of the device in FIGS. 1 and 2 in response to selection of the "adjust vehicle top speed limiter" button of FIG. 4.

FIG. 17 shows an exemplary "adjust top speed limiter to match speed ratings of tires" menu 180 displayed on the touch screen 12 of the device 10 in response to selection of the "adjust vehicle top speed limiter" button 116 of FIG. 4.

Figure 18:
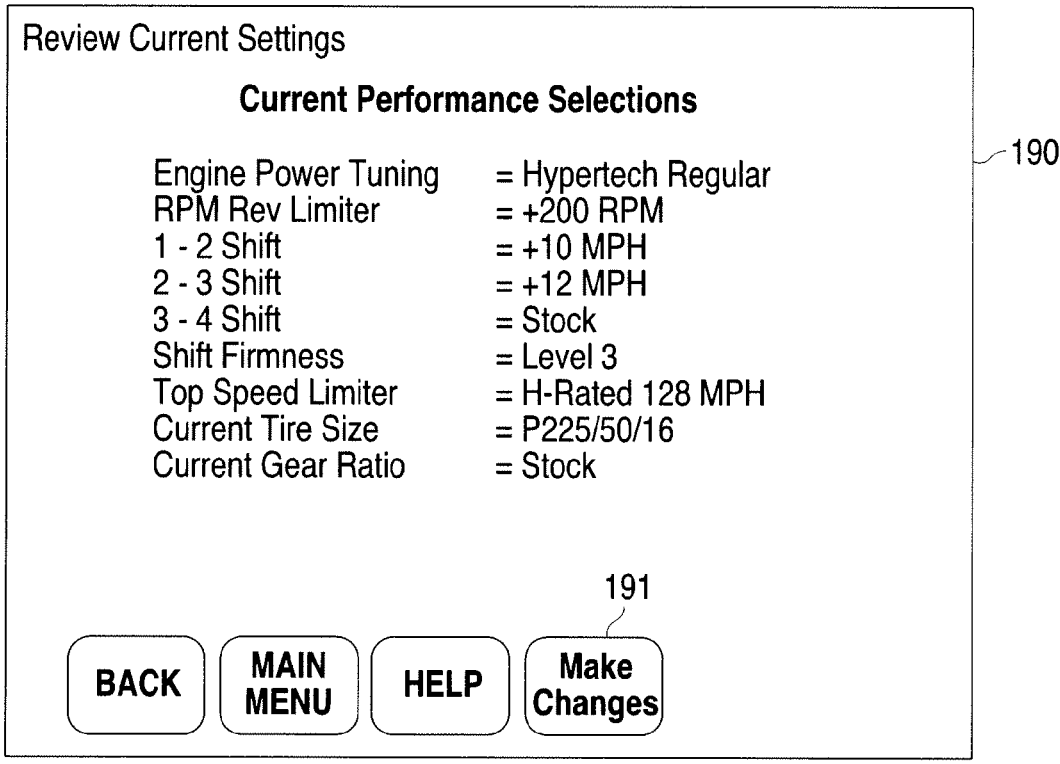
FIG. 18 shows an exemplary "review current setting" menu displayed on the touch screen of the device in FIGS. 1 and 2 in response to selection of the "review settings" button of FIG. 4.

FIG. 18 shows an exemplary "review current setting" menu 190 displayed on the touch screen 12 of the device 10 in response to selection of the "review settings" button 118 of FIG. 4. The settings shown in FIG. 18 are initially set to the stock settings for the vehicle before any changes are entered by the user. A "make changes" button 191 is provided on the display 190 of FIG. 18 to enable the user to make change the settings shown.

Figure 19:
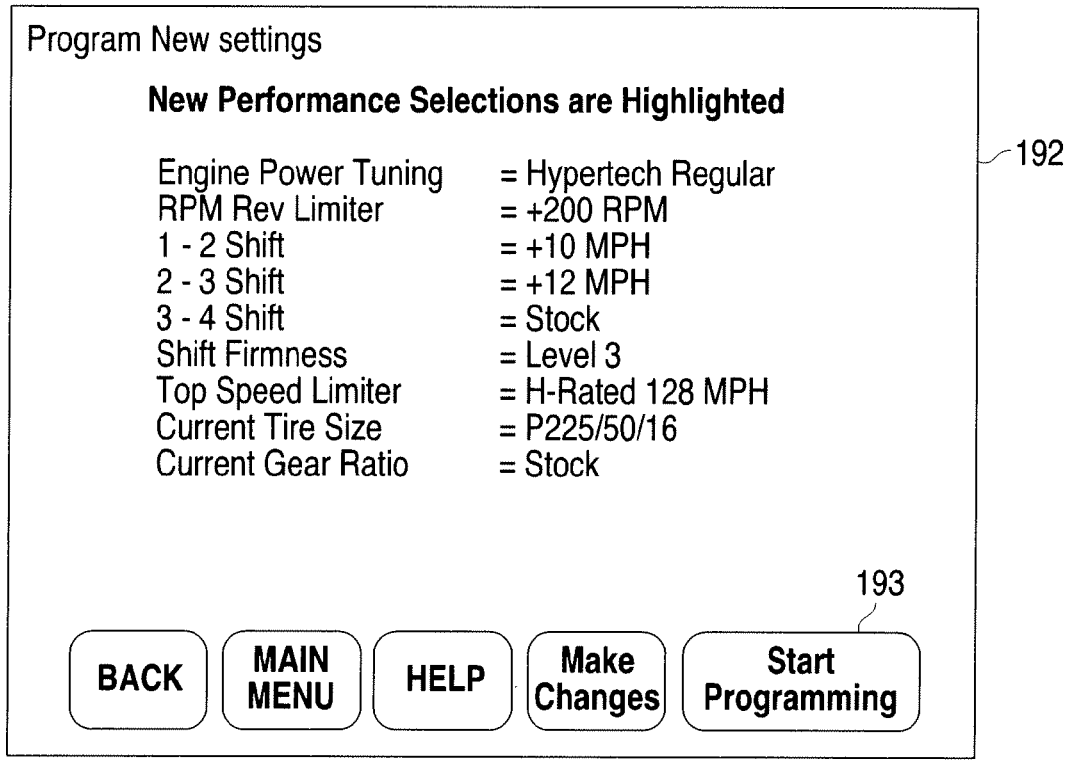
FIG. 19 shows an exemplary "program new settings" menu displayed on the touch screen of the device in FIGS. 1 and 2 for enabling a user to review changes made.

FIG. 19 shows an exemplary "program new settings" menu 192 displayed on the touch screen 12 of the device 10 for enabling a user to review changes made. FIG. 19 is displayed after "start programming" button 119 of FIG. 4 is selected after changes to the previous settings have been made. The device 10 provides a "start programming" button 119 of FIG. 4 and 193 in FIG. 19 to enable the user to requesting the performance tuning programming to proceed.

Figure 22:
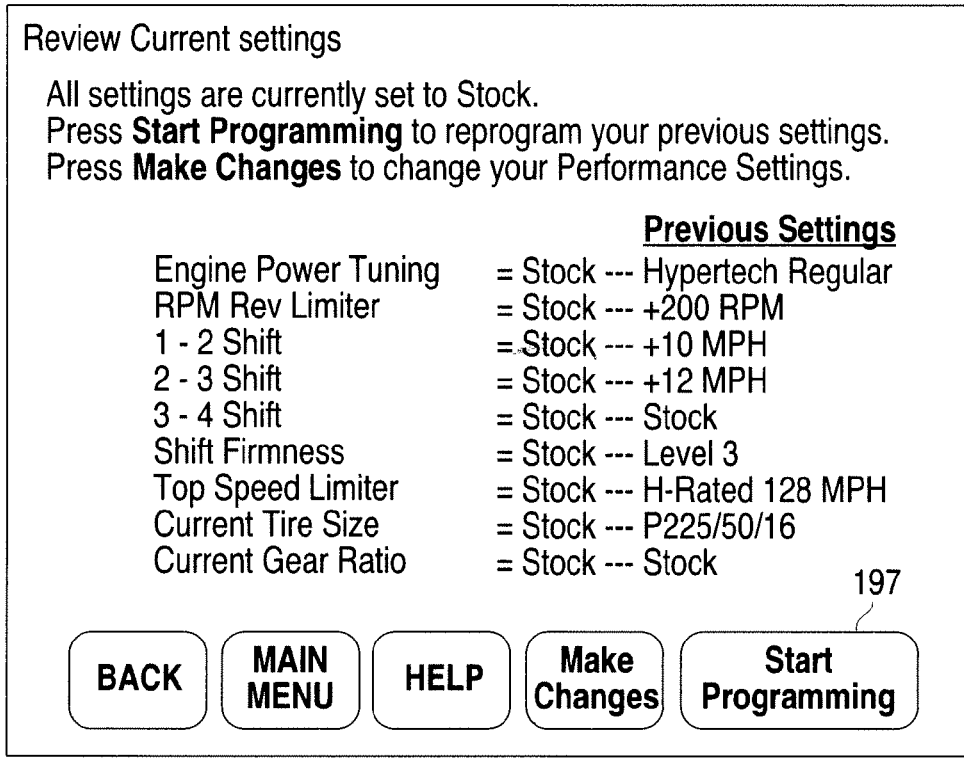
FIG. 22 shows an exemplary "review current settings" menu displayed on the touch screen of the device in FIGS. 1 and 2 in response to selection of the "review settings" button after the device has been reinstalled and all settings are set to stock.

FIG. 20 shows an exemplary "return all performance settings to stock" menu 198 displayed on the touch screen 12 of the device 10 in response to selection of the "return all setting to stock" button 117 of FIG. 4. The stock settings are stored in the memory 18 of device 10 along with previous performance selection settings. The "start programming" button 195 of menu 194 initiates the reprogramming back to the stock settings. The menu 198 indicates that the previous settings are saved and that after reinstalling the device, review changes should be selected to enable display of a menu, as seen in the example in FIG. 22, from which previous settings can be restored. FIG. 21 shows an exemplary "programming error screen" menu 196 displayed on the touch screen 12 of the device 10 in response to selection of a start programming button for initiating programming without any changes having been made. FIG. 22 shows an exemplary "review current settings" menu 198 displayed on the touch screen 12 of the device 10 in response to selection of the "review settings" button 118 after the device has been reinstalled and all settings are set to stock. The menu 198 enables the user to select reprogramming of previous settings via the start programming button 199.

The diagnostics program and corresponding mode is selectable via button 600 on the main menu of FIG. 3. The diagnostics mode identifies Diagnostic Trouble Codes (DTCs) and provides a user with informative text descriptions thereof, so as to eliminate the need for a user to look up code numbers to determine problems. Device 10 also provides a way for a user to clear the DTCs without the need for expensive customized equipment for that purpose. The present invention providing display of DTCs and the associated text descriptions and enabling the clearing of selected DTCs in a portable multi-purpose device without requiring expensive customized equipment for that purpose.

The engine monitor program and corresponding mode is selectable via button 500 on the main menu of FIG. 3. The diagnostic port 2 is one source of information that is made available on a selective basis for display in the Engine Monitor program. Typical information available from the diagnostic port 2 includes but is not limited to RPM, water temp, oil pressure, oil temp, injector pulse width, and air flow. The device 10 calculates and displays the air/fuel ratio which is critical for maximum, safe vehicle performance.

FIG. 3 includes the button 200 on the main menu 30 to enable selection of the drag strip program and corresponding mode. FIG. 3 also includes the button 300 on the main menu 30 to enable selection of the dyno shop (dynamometer) program and corresponding mode. The common elements for the drag strip and dyno shop programs are that the device 10 gathers and "time stamps" data such as vehicle speed, distance (derived by numeric integration of the velocity values over the length of the run), engine RPM, engine air temperature, and air pressures, and stores the data in a file. Measured time, measured velocity, and calculated distance data serves as the basis for the drag strip and dyno shop programs. The drag strip program is a report of measured times and velocities at certain distances down the track. The drag strip program provides a report of the times for zero to 10, 20, M.P.H. and so on, all the way up to any speed, until the user lets off the throttle and begins to decelerate.

Figure 23:
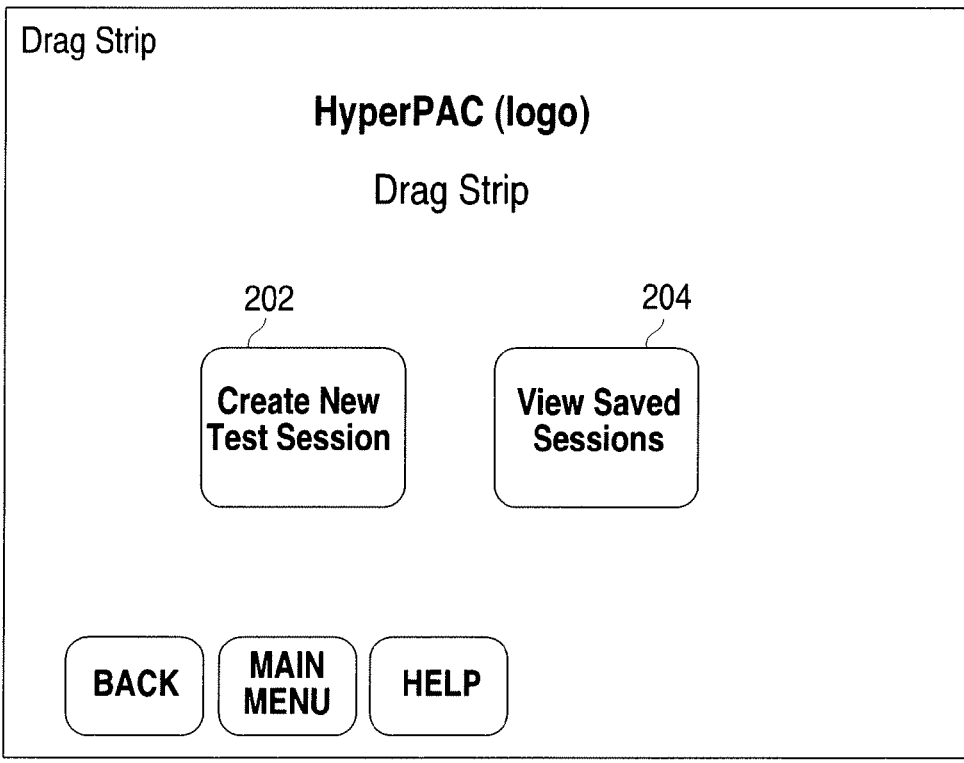
FIG. 23 shows an exemplary drag strip menu displayed on the touch screen of the device in FIGS. 1 and 2 in response to selection of the drag strip program button shown in FIG. 3.

FIGS. 23-31 show exemplary screens displayed by the device of FIGS. 1 and 2 for the Drag Strip program. FIG. 23 shows an exemplary drag strip menu 200 displayed on the touch screen 12 of the device 10 in response to selection of the drag strip program 200 shown in FIG. 3.

Figure 24:
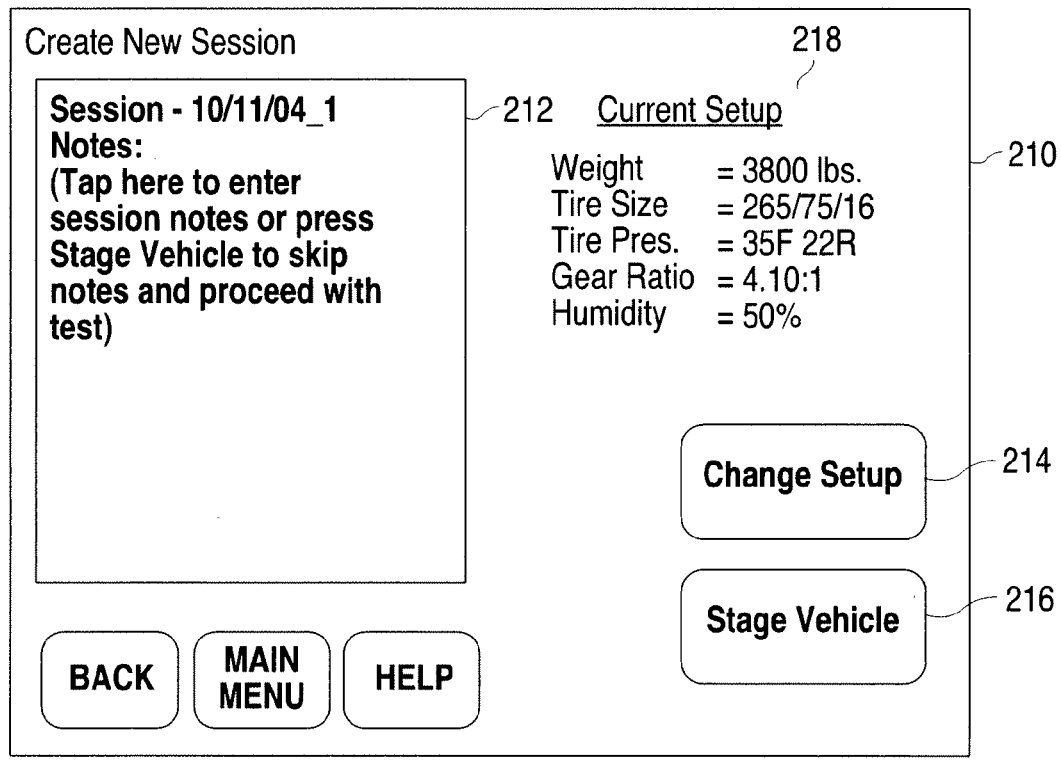
FIG. 24 shows an exemplary "create new sessions" menu screen displayed on the touch screen of the device in FIGS. 1 and 2 in response to selection of a "create new test session" button.
Figure 25:
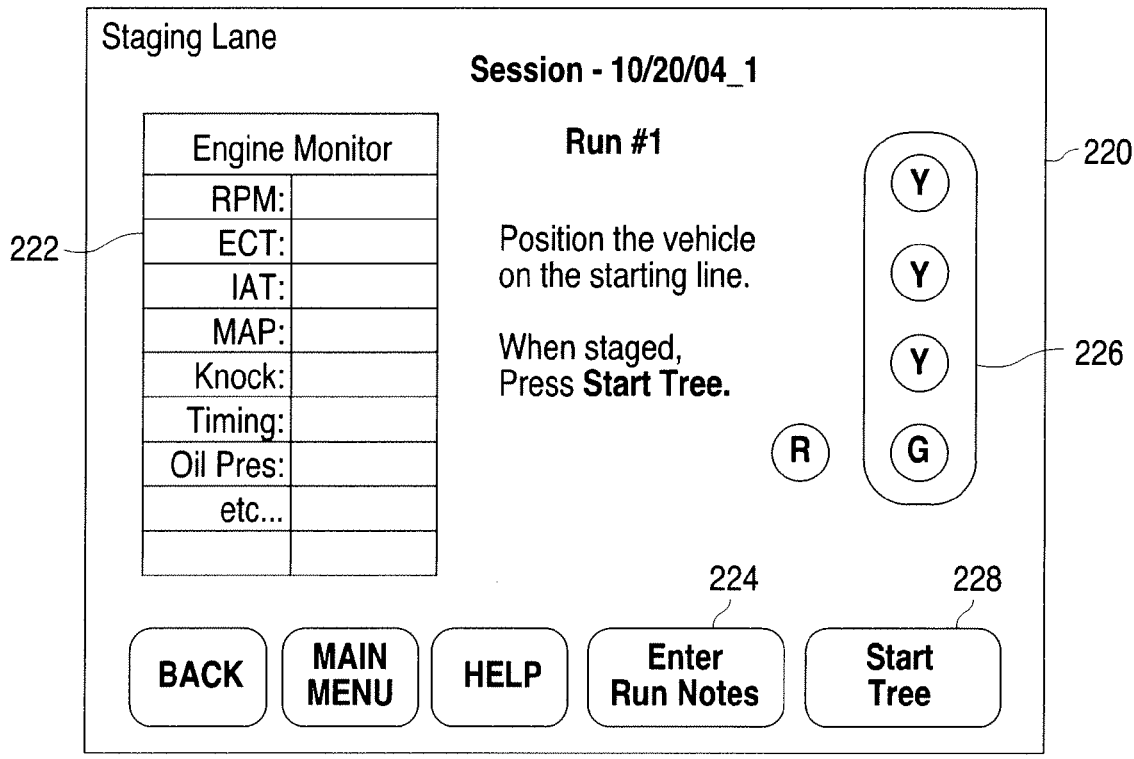
FIG. 25 shows an exemplary "staging lane" menu screen displayed on the touch screen of the device in FIGS. 1 and 2 in response to selection of the "stage vehicle" button of FIG. 24.

FIG. 24 shows an exemplary "create new sessions" menu screen 210 displayed on the touch screen 12 of the device 10 in response to selection of a "create new test session" button 202 on menu 200. FIG. 25 shows a session notes area 212 on the screen. Preferably, a blinking cursor is displayed in area 212 to highlight this area. The system enables the user to selectively touch area 212 if the user desires to enter notes for the drag strip session. Preferably, the system provides a keyboard display to enable the user to enter session notes, vehicle information, owner information, and other text inputs. A keypad is displayed for entry of numerical information. The keyboard and numeric keypad display are conventional elements well known to one of ordinary skill in the art, .e.g. a QWERTY keyboard and standard ten digit numeric keypad. As seen in the example in FIG. 24, the user may choose to skip the notes and proceed to a test by pressing the "stage vehicle" button 216.

The menu screen 210 also shows an exemplary current setup list 218 of items that can affect any of the test measurements. A "change setup" button 214 is provided on menu screen 210 to enable a user to make changes in the setup prior to making a run. Selection of the "change setup" button 214 will take the user to the Vehicle/Owner Information screen (not shown) for selection and modification of the relevant vehicle settings listed in list 218. Once the user has entered the changes, the user is returned to the "create new session" menu screen 210 which will show the updated current setup.

FIG. 25 shows an exemplary "staging lane" menu screen 220 displayed in response to selection of the "stage vehicle" button 216 of FIG. 24. Real time vehicle characteristics data will be shown in the engine monitor section 222. The data displayed in section 222 is initially locked to the selected characteristics shown in FIG. 25 from the onboard diagnostics system. Alternatively, the device 10 enables the user to customize the list of engine characteristics shown within the limitations of the screen size and font size.

An "enter run notes" button 224 on exemplary menu screen 220 of FIG. 25 is selectable by the user to cause display of a standard keyboard to enable entry of notes specific to the individual run, e.g., "stock tuning run" or "HYPERTECH Power tuning run using regular". The run notes are saved in the device 10 and carried over for all subsequent runs within the current test session.

The "staging lane" menu screen 220 includes a "start tree" button 228 for initiation of a drag strip "tree" mode. In operation, the user is instructed, as shown in FIG. 25, to select "start tree" only after the vehicle is positioned on the starting line and ready to begin the run, i.e., staged. A short time delay is provided in response to selection of the tree mode, preferably an audible tone is provided to signal the user that the tree is about to start. A tree preferably includes four lights positioned in a column including three yellow lights above a green light indicator as seen in the example tree 226 in FIG. 25. The tree 226 is exemplary; other depictions of the tree or any similar start sequence may be used. The on/off sequence of the lights of tree 226 is preferably in ½ second intervals, once the tree is started. The device 10 time stamps the moment when the last light of the tree is lit, i.e., the green light, and measures the time from that point indicative of the start point of the run. The device 10 calculates the time from the start point to a one foot distance for calculating reaction time. The timer is started based upon an initial trigger start point.

Figure 26:
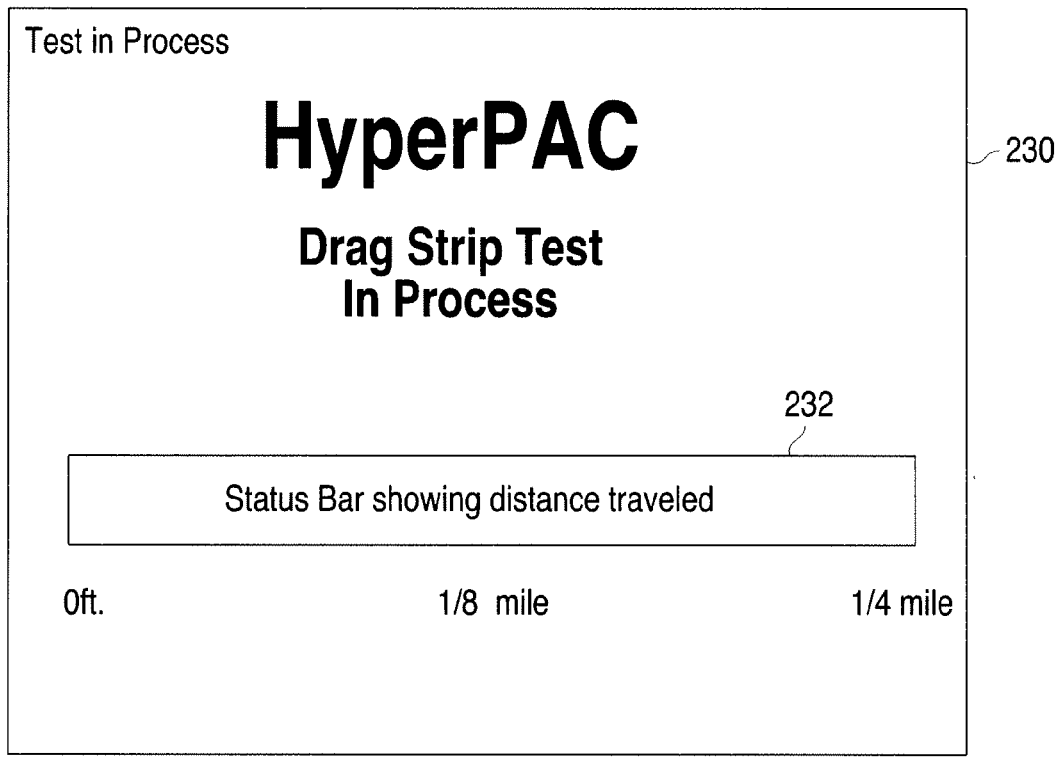
FIG. 26 shows an exemplary "drag strip test in process" screen displayed on the touch screen of the device in FIGS. 1 and 2 during the drag strip run.

FIG. 26 shows an exemplary "drag strip test in process" screen 230 displayed during the drag strip run. In the example in FIG. 26, the screen 230 includes a status bar 232 indicating distance traveled during the drag strip run. Preferably, the device 10 emits three or four brief audible tones to signal the user that the ¼ mile mark has been reached. The device 10 preferably includes circuitry for generating the audio tones—such circuitry for portable devices is well known in the art. This screen is displayed until a stop trigger is received. The device 10 preferably detects a point at which the vehicle comes to a complete stop, i.e., the stop trigger is indicative that the run has been completed.

FIGS. 27-31 show exemplary drag strip screens that are selectively displayable after the run is completed. The device 10 enables the user to restage for another drag strip run via a "next run" button, e.g., 243 in FIG. 27, or end the test session via an "end session" button, e.g., 245 in FIG. 27. As seen, the exemplary screens shown in FIGS. 28 and 29 also include the "next run" and "end session" buttons. The device 10 returns the user to the main "staging lane" screen 220 shown in FIG. 25 if the user selects one of the "next run" buttons in FIGS. 27-29. The device 10 returns the user to the main Drag Strip screen 200 shown in FIG. 23 if the user selects one of the "end session" buttons in FIGS. 27-29 after the test run. The screens of FIGS. 27-29 also include a "run notes" button, e.g., 247 in FIG. 27, to enable viewing of notes for the particular run.

Figure 27:
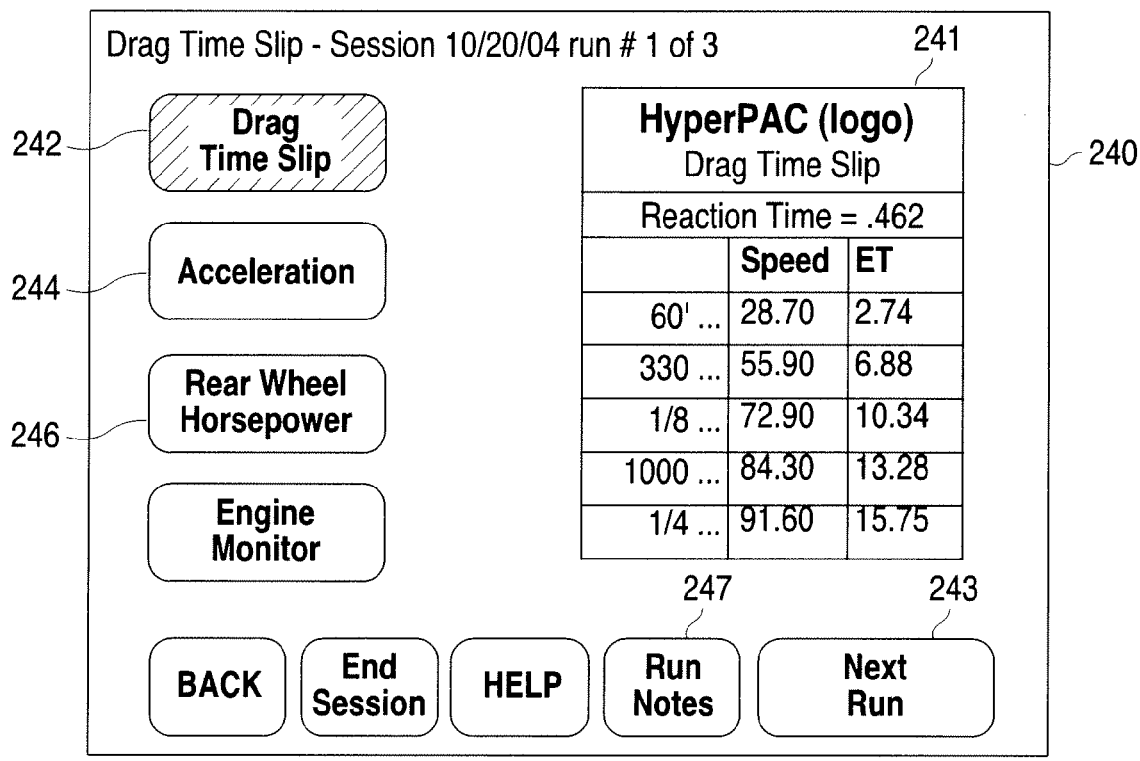
FIG. 27 shows an exemplary "drag time slip" menu screen that is first displayed after the device in FIGS. 1 and 2 detects a stop trigger.
Figure 28:
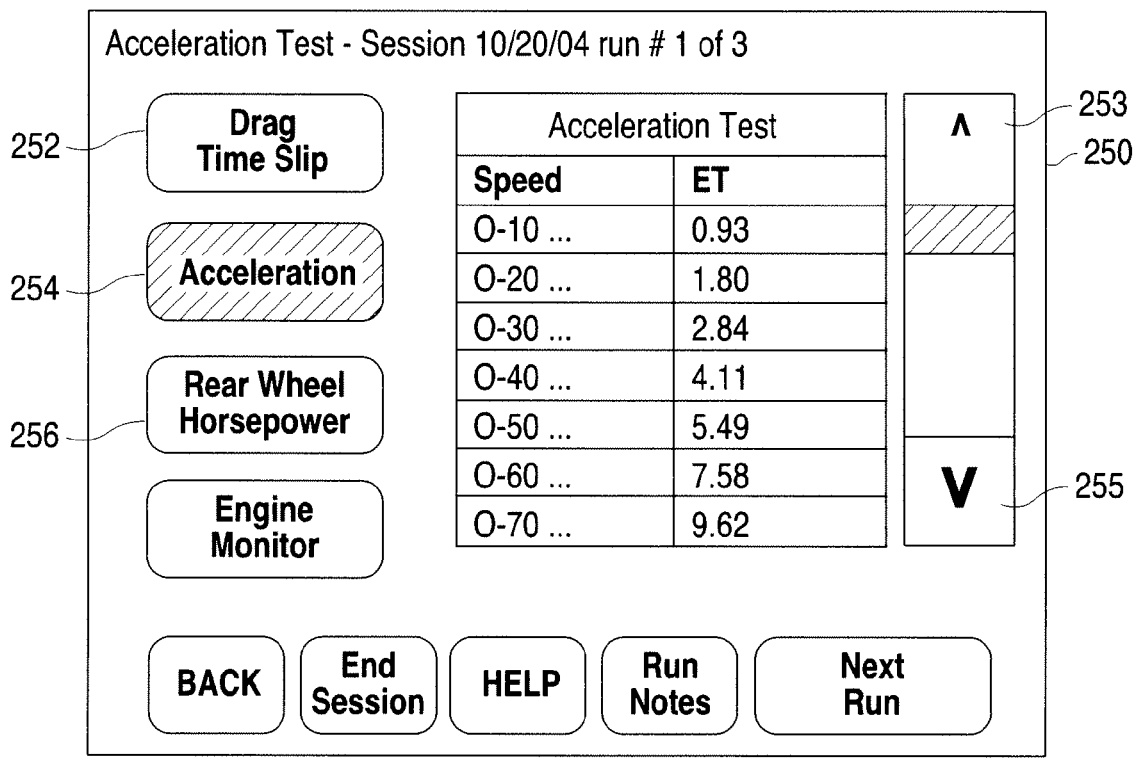
FIG. 28 shows an exemplary acceleration test screen displayed on the touch screen of the device in FIGS. 1 and 2 in response to selection of an "acceleration" button.
Figure 29:
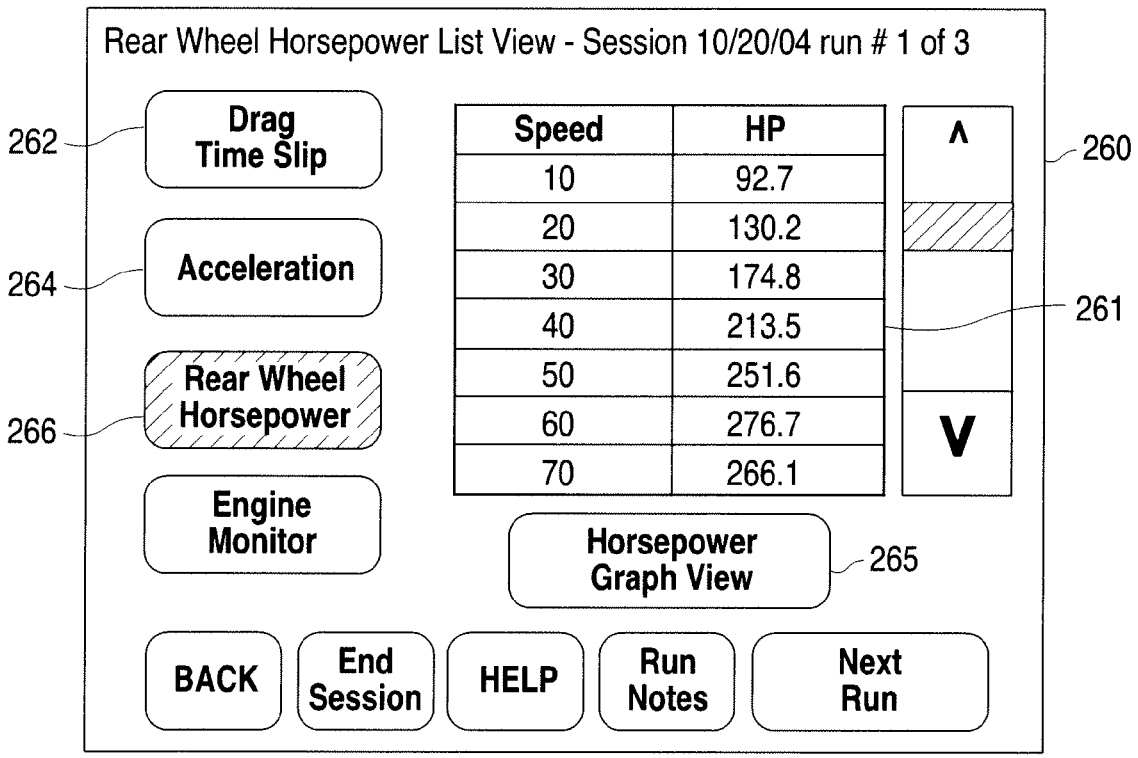
FIG. 29 shows an exemplary "rear wheel horsepower" screen displayed on the touch screen of the device in FIGS. 1 and 2 in response to selection of a "rear wheel horsepower" button.

In the examples shown in FIGS. 27-29, the menu screens includes a "drag time slip", an "acceleration", a "rear wheel horsepower", and an "engine monitor" button enabling a user to request the corresponding displays shown in FIGS. 27-29, and 31. FIG. 27 shows an exemplary "drag time slip" menu screen 240 first displayed after the device 10 detects the stop trigger. Screen 240 is also displayed in response to selection of the "draft time slip" button, e.g., 252 in FIG. 28, and 262 in FIG. 29. The exemplary drag time slip results table 241 of FIG. 27 shows exemplary data for reaction time, distance at the left column, along with a speed column, and elapsed time ("et").

FIG. 28 shows an exemplary acceleration test screen displayed in response to selection of an "acceleration" button, e.g., 242 in FIG. 27, and 264 in FIG. 29. The exemplary acceleration test results table 251 of FIG. 27 shows exemplary data in a speed and elapsed time column to show time to predetermined speeds from a stop. The acceleration screen 250 also includes up arrow 253 and down arrow 255 operable to enable viewing additional acceleration test data on the touch screen display.

Figure 30:
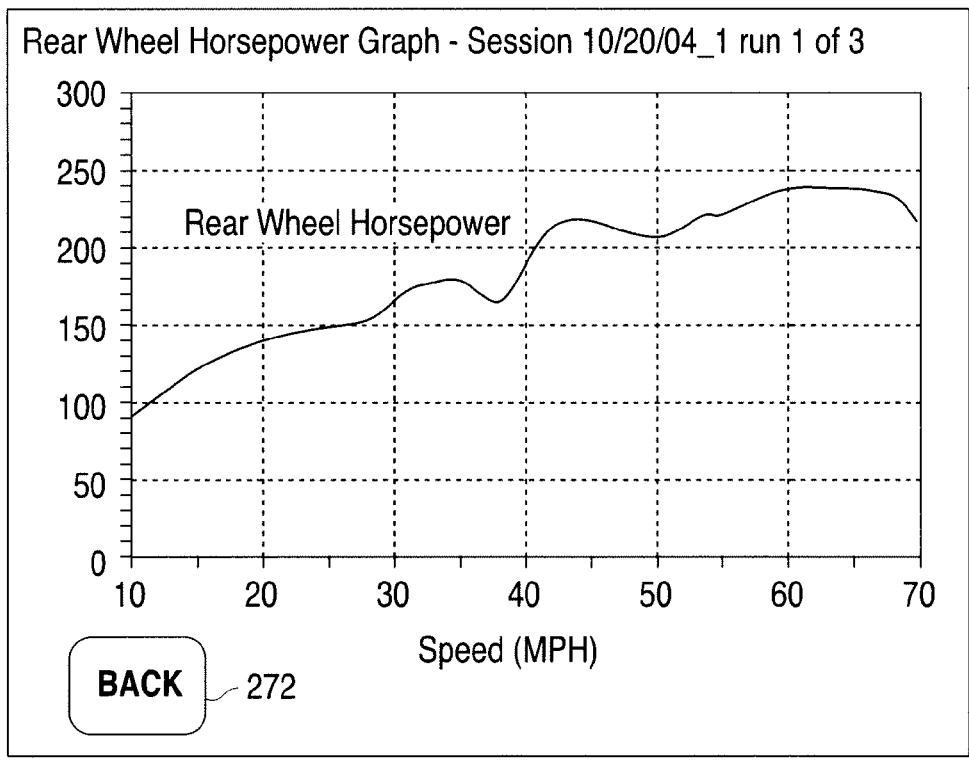
FIG. 30 shows an exemplary "horsepower graph view"

FIG. 29 shows an exemplary "rear wheel horsepower" screen 260 in response to selection of a "rear wheel horsepower" button, e.g., 246 in FIG. 27, and 256 in FIG. 28. FIG. 29 shows a tabular view 261 of speed and horsepower ("HP") as shown in the example. A "horsepower graph view" button 265 is provided on screen 260 to enable selection of a graphical display, such as shown in screen 220 in the example in FIG. 30. FIG. 30 includes a back button 272 to enable return to the tabular view of FIG. 29.

Figure 31:
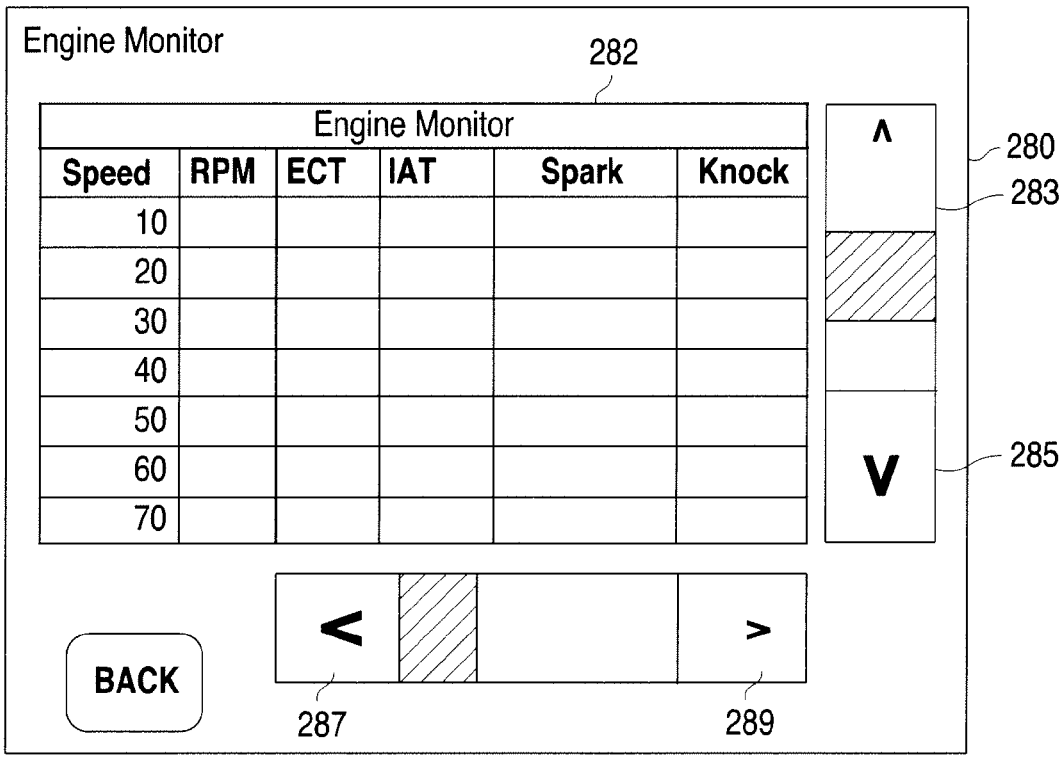
FIG. 31 shows an exemplary "engine monitor" screen displayed in response to selection of one of the "engine monitor" buttons shown in the example screens in FIGS. 27-29.

FIG. 31 shows an exemplary "engine monitor" screen 280 displayed in response to selection of one of the "engine monitor" buttons shown in the example screens in FIGS. 27-29. The "engine monitor" screen 280 includes a table 282 the displays preselected characteristics data obtained from the onboard diagnostic system during the test run. The "engine monitor" screen 280 also includes up arrow 283, down arrow 285, left arrow 287, and right arrow 289 to enable viewing of additional engine monitor test data on the touch screen display.

Figure 32:
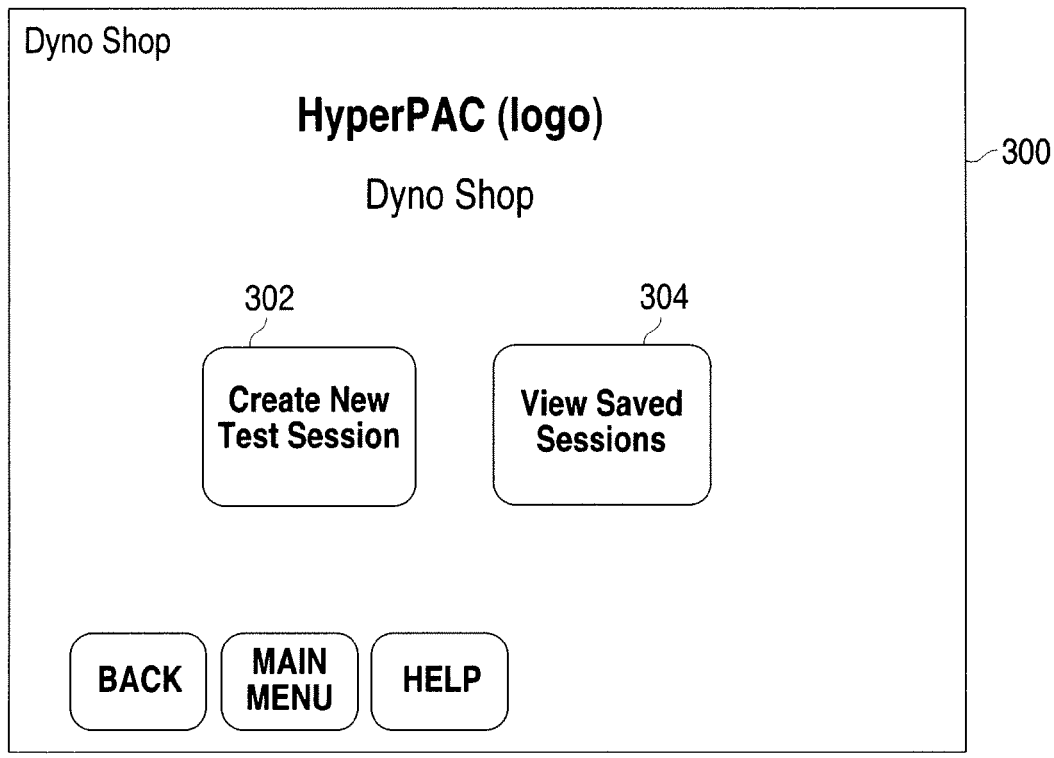
FIG. 32 shows an exemplary "dyno shop" menu displayed on the touch screen of the device in response to selection of the dyno shop program button shown in FIG. 3.

FIGS. 32-37 show exemplary screens displayed by the device of FIGS. 1 and 2 for the Dyno Shop (Dynamometer) program. FIG. 32 shows an exemplary "dyno shop" menu 300 displayed on the touch screen 12 of the device 10 in response to selection of the dyno shop program 300 shown in FIG. 3.

Figure 33:
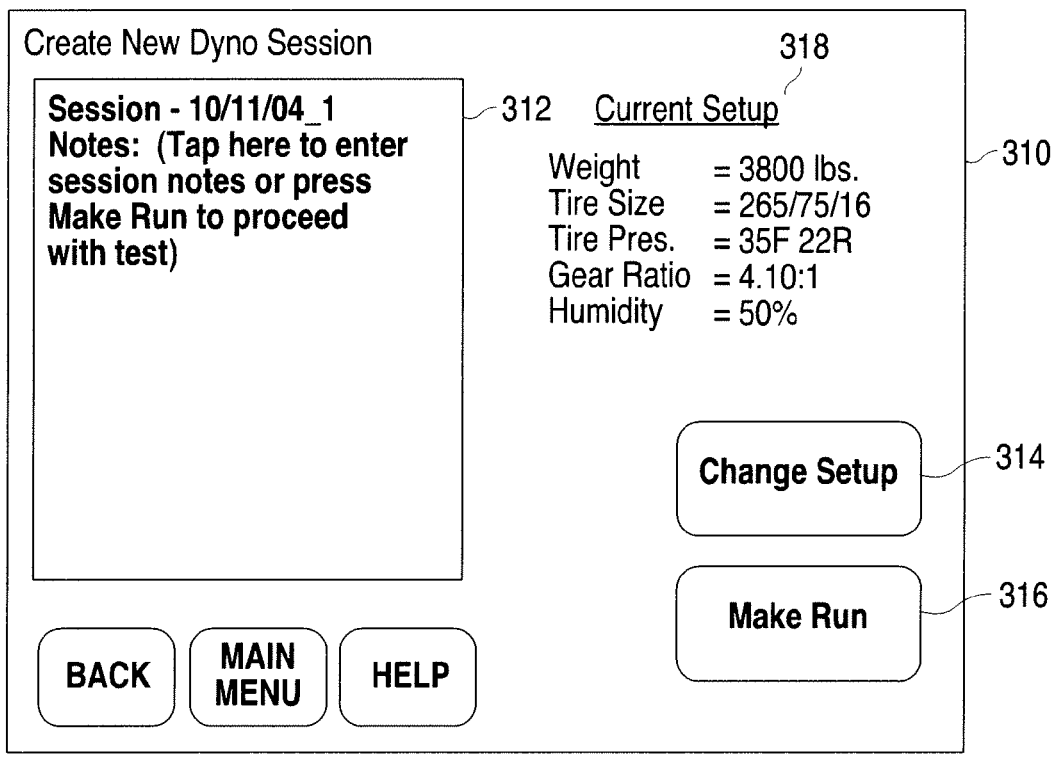
FIG. 33 shows an exemplary "create new dyno session" menu screen displayed on the touch screen of the device in response to selection of a "create new test session" button on menu in FIG. 32.

FIG. 33 shows an exemplary "create new dyno session" menu screen 310 displayed on the touch screen 12 of the device 10 in response to selection of a "create new test session" button 302 on menu 300 in FIG. 32. FIG. 33 shows a session notes area 312 on the screen. Preferably, a blinking cursor is displayed in area 312 to highlight this area. The system enables the user to selectively touch area 312 if the user desires to enter notes for the dyno shop session. Preferably, the system provides a keyboard display to enable the user to enter session notes, vehicle information, owner information, and other text inputs. A keypad is displayed for entry of numerical information. The keyboard and numeric keypad display are conventional elements well known to one of ordinary skill in the art, e.g., a QWERTY keyboard and standard ten digit numeric keypad. As seen in the example in FIG. 24, the user may choose to skip the notes and proceed to a test by pressing the "make run" button 316.

The menu screen 310 also shows an exemplary current setup list 318 of items that can affect any of the test measurements. A "change setup" button 314 is provided on menu screen 310 to enable a user to make changes in the setup prior to making a run. Selection of the "change setup" button 314 will take the user to the Vehicle/Owner Information screen (not shown) for selection and modification of the relevant vehicle settings listed in list 318. Once the user has entered the changes, the user is returned to the "create new dyno session" menu screen 310 which will show the updated current setup.

Figure 34:
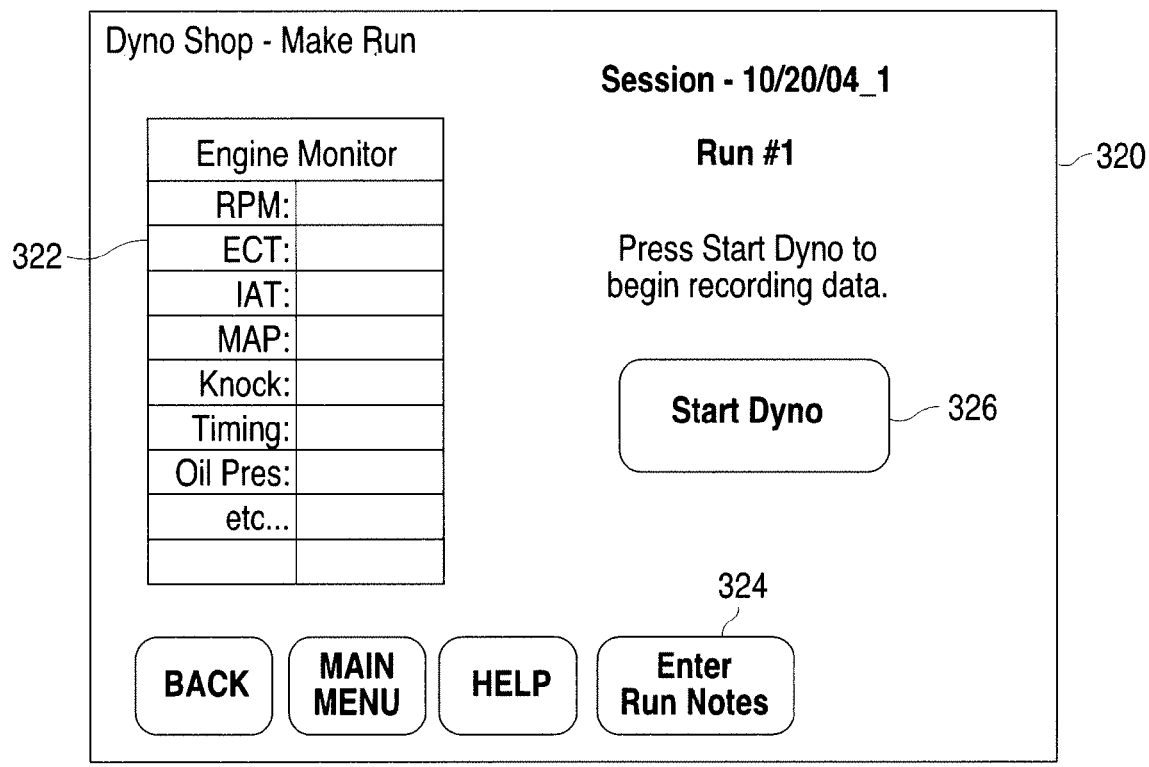
FIG. 34 shows an exemplary "dyno shop—make run" menu screen displayed in response to selection of the "make run" button of FIG. 33.

FIG. 34 shows an exemplary "dyno shop—make run" menu screen 320 displayed in response to selection of the "make run" button 316 of FIG. 33. Real time vehicle characteristics data will be shown in the engine monitor section 322. The data displayed in section 322 is initially locked to the selected characteristics shown in FIG. 34 from the onboard diagnostics system. Alternatively, the device 10 enables the user to customize the list of engine characteristics shown within the limitations of the screen size and font size.

An "enter run notes" button 324 on exemplary menu screen 320 of FIG. 34 is selectable by the user to cause display of a standard keyboard to enable entry of notes specific to the individual run. The run notes are saved in the device 10 and carried over for all subsequent runs within the current test session.

Figure 35:
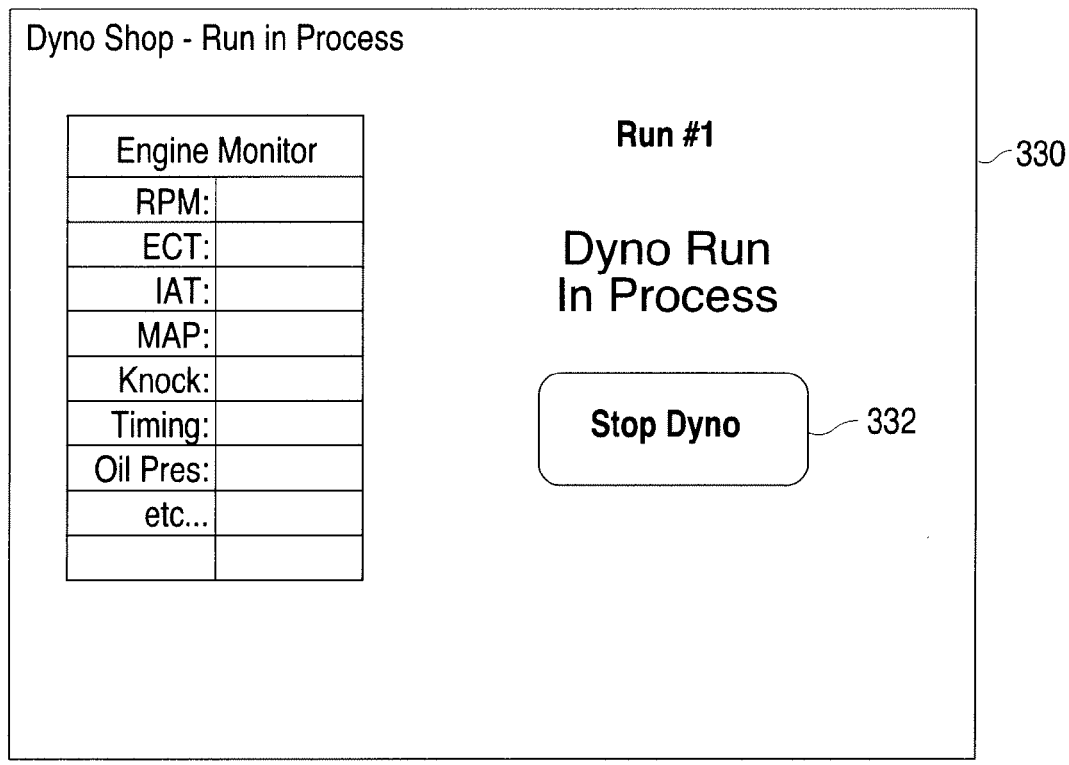
FIG. 35 shows an exemplary screen for a dyno run in process.

Selection of a "start dyno" button 326 in the exemplary screen of FIG. 34 sets the trigger to start collecting data for a run in process. FIG. 35 shows an exemplary screen 330 for a dyno run in process. Alternatively, the "dyno run in process" screen includes display of an RPM analog gauge or vehicle speed sensor gauge to show graphically the corresponding data.

Figure 36:
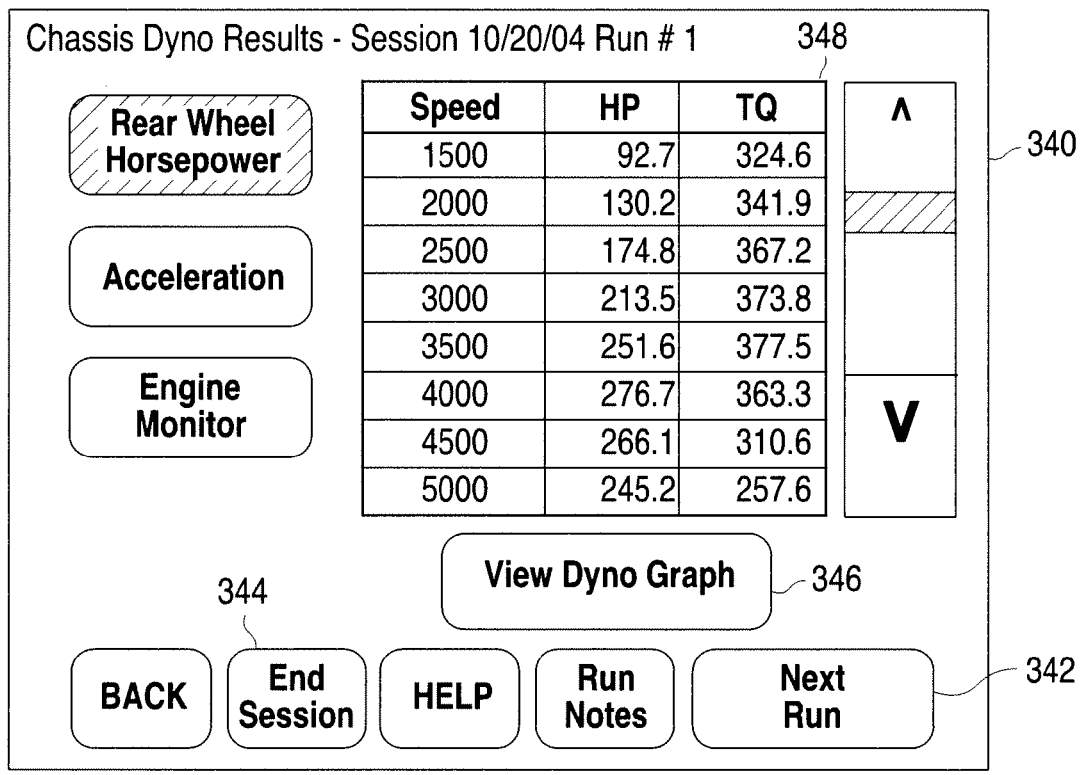
FIG. 36 shows an exemplary "chassis dyno results" menu screen displayed in response to selection of a "stop dyno" button in FIG. 35.

FIG. 36 shows an exemplary "chassis dyno results" menu screen 340 displayed in response to selection of a "stop dyno" button 332 seen in FIG. 35. FIG. 36 shows a tabular view 348 of RPM, HP, and torque ("TQ") as shown in the example. In response to selection of a "next run" button 342 of menu screen 340, the system returns the user to the "dyno shop—make run" menu screen 320 shown in FIG. 34. Selection of the "end session" button 344 of screen 340 of FIG. 36 after a run causes the user to be returned to the main "dyno shop" screen 300 shown in the example in FIG. 32.

Figure 37:
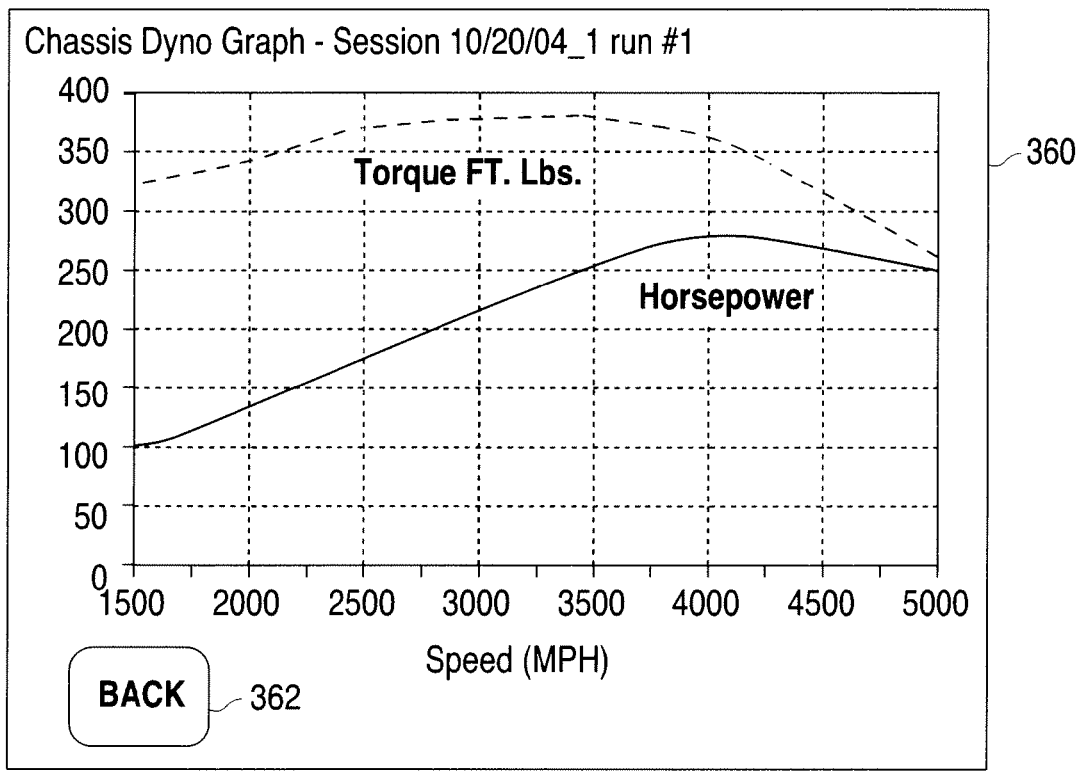
FIG. 37 shows an exemplary graphical display of the dyno shop results shown in tabular form in FIG. 36.

A "view dyno graph" button 346 is provided on screen 340 to enable selection of a graphical display of the results, such as shown in the exemplary screen 360 in FIG. 37. FIG. 37 includes a back button 362 to enable return to the tabular view of FIG. 36.

Figure 38:
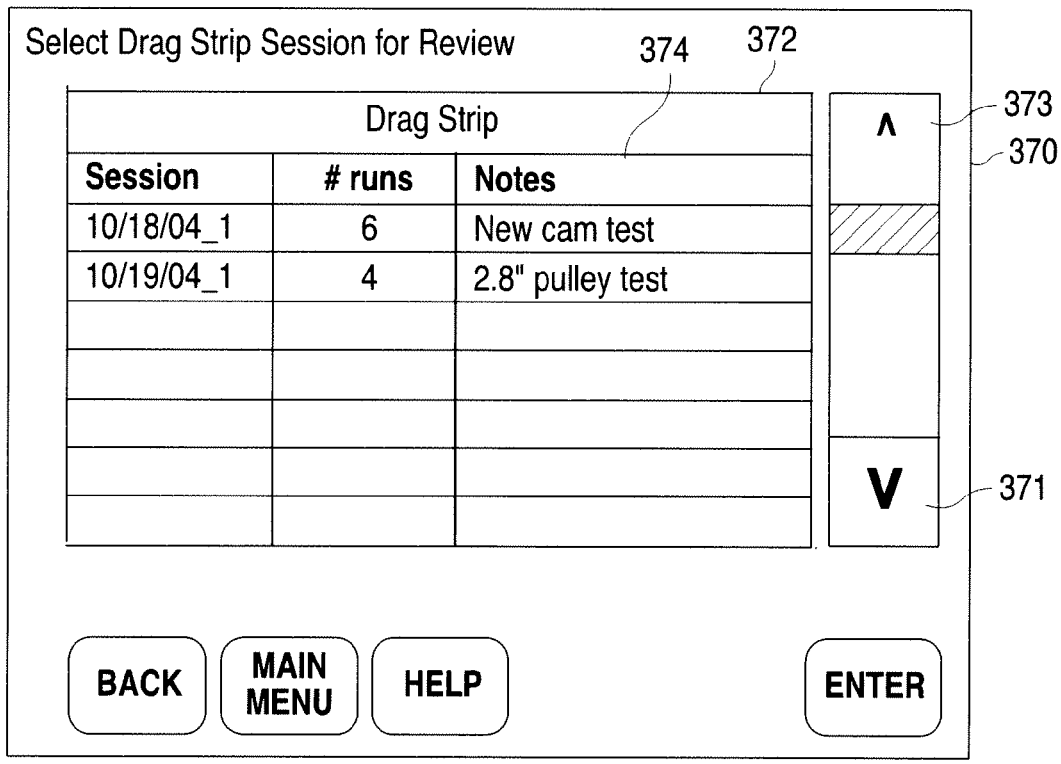
FIG. 38 shows an exemplary screen displayed in response to selection of a view saved sessions button of the drag strip program screens for enabling a user to select drag strip sessions for review.

FIG. 38 shows an exemplary screen 370 displayed in response to selection of a "view saved sessions" button of the drag strip program screens for enabling a user to select drag strip sessions for review. The "view saved sessions" button 204 in FIG. 23 for the drag strip program, and button 304 on FIG. 32 for the dyno shop program are included to enable viewing of the corresponding saved session. The table 372 has a screen heading 374 that depends on whether the saved session was selected from the drag strip or dyno shop screens. The heading for selection from the drag strip menu preferably reads, "select drag strip session for review" as shown in the example in FIG. 38. The heading for selection of review saved sessions from the dyno shop main menu preferably reads, "select dyno session for review". The screen 370 also includes up arrow 373 and down arrow 375 operable to enable viewing of additional session information on the touch screen display.

The device 10 enables the user to select one of the listed sessions, e.g. in table 372, for further review in a review mode. In the review mode, exemplary screens as shown in FIGS. 27-31 for drag strip sessions and FIGS. 36-37 for dyno shop sessions are selectively displayed to the user, as described above, except that selection the "end session" button while in the review mode will return the user to screen 370 shown in the example in FIG. 38.

Based on the screen shots shown in FIGS. 3-38, the implementation of this functionality in a software program is well within the skill of one of ordinary skill in the art.

The accuracy of measured time, measured velocity, and calculated distance data are critical because these characteristics serve as the basis for the calculations for the drag strip and dyno shop (dynamometer) programs. These values as developed and reported by the diagnostic port 2 connected to the onboard diagnostic system 6 have two serious flaws that have so far prevented any prior art device based thereon from being either accurate or repeatable. Before this information is used by device 10, according to the present invention, for generating the corresponding data for the drag strip program displays, e.g., FIGS. 26-32, and for the horsepower and torque calculations and display in dyno shop mode, device 10 corrects and accounts for the two flaws in PCM reported velocities, and the distance values calculated from them.

As described in the background, the time interval and the short distance traveled from "first movement" of the vehicle, i.e., the start time, during a test run until the velocity value is provided at the diagnostic port introduces an unknown error that varies from test to test randomly, and, therefore, gives false, unreliable fluctuating results for conventional methods. In order to correct for this unknown error, the system of the present invention includes a start time detector 22 in FIG. 2 for detecting the start time of the vehicle, preferably as a function of the first movement of the vehicle, independent of the onboard diagnostic system and its diagnostic port, in order to account for the unknown errors. Preferably, an accelerometer is included as a start time detector 22 to provide an accurate "first movement" trigger. The accelerometer is preferably contained on an integrated circuit chip in the device 10. According to a preferred embodiment of the present invention, at the time of the first movement trigger, the system starts a clock for measuring time such that the precise time taken to reach the time-stamped first PCM delivered velocity value is now known. Each time increment for each drive-shaft revolution, and the corresponding linear distance, is then continuously added and summed over the test period. In other words, the moment the accelerometer sends a signal to a clock, it corresponds to time zero, and then the clock begins to run continuously as the vehicle begins its run down the track. Alternatively, a mercury switch, triggered by the initial movement of the vehicle or a "foot off the brake" indication, or the like, is used as a start time detector to detect the first movement of the vehicle.

The start time, preferably obtained from the "first movement trigger", allows development of an accurate timeline, however, the distance from first movement to the first velocity value from the diagnostic port is still unknown. Wheel spin presents another challenge because the velocity values from the diagnostic port are distorted during wheel spin such that distance calculations would otherwise be inaccurate. The presumed distance traveled based on velocity value read is artificially high if the tires are spinning. Wheel spin of varying times and distances down the track thus would seem to make accuracy impossible. Conventionally, this has up-to-now appeared to be an unsolvable problem.

The following describes in further detail how the present invention solves for wheel spin, if present, and solves for the unknown distance and time to reach the first PCM delivered velocity. The present invention accurately solves for the two above described problems irrespective of the random nature of the first distance value, and irrespective of the amount of error due to wheel spin, if present.

According to a preferred embodiment, the accelerometer of the present invention provides the first movement trigger and starts a clock in the device 10. The device 10 puts a time stamp on each velocity signal read from the diagnostic port 2. It could be anything from 0.001 seconds to some later time point, e.g., 652 seconds from the time the clock starts (as determined from the signal from the detector), until the first velocity reading is available and read. The time checks come at the first velocity reading and it is referenced off of the "first movement" trigger at time zero when the accelerometer sent its signal. The velocity updates from the vehicle's diagnostic port come at regular intervals that vary from vehicle to vehicle, e.g., every 0.060 seconds up to 0.25 seconds. The digitized velocity data read from the diagnostic port is "smoothed", and stored in a file. So when the vehicle starts moving, the accelerometer signal provides the first movement trigger and the clock starts. A time stamp is put on each velocity signal that comes in from there until the end of the run. The time that it takes the vehicle to travel a ¼ mile and other predetermined distances are calculated. The time to reach one or more predetermined speeds is also recorded.

Accounting for wheel spin is done by the process described in further detail below. The numerical derivative of the velocity values received via the diagnostic port from the vehicle is used to create a file of acceleration values, and a numerical integration of the velocity data is performed to calculate distance travelled. Most acceleration and velocity numbers, in the case of wheel spin, will typically be erratic in nature, extraordinarily high initially, but once the tire hooks up with the track, the velocity values from the vehicle drop from their artificial high values down to the vehicle's actual speed from which a smooth curve is thereafter obtained. In the case of wheel spin, the acceleration curve also starts off with a high spike and then drops down to about zero acceleration as the vehicle just spins its tires until the tires hook up to the track, such that the data thereafter accurately reflects vehicle movement. Through analysis of the velocity and acceleration stored data, a point is found at which each of the numbers become accurate. In other words, there is a point after wheel spin stops when the velocity and acceleration numbers settle onto a smooth curve. At the point of settling, the inflection point, it is known that the distances that had been calculated based on velocity during the wheel spin are not true values. The present invention solves equations from the inflection point, when wheel spin has stopped, backwards on the curve down to time zero. By looking backward, corrected velocity curve and acceleration curve values are calculated for the interval of time from the start point to the time the wheel spin stops. From the corrected curves, an accurate distance is calculated, so the method takes the false distance due to the spinning the tires and the unknown distance traveled because of not knowing the distance and time relative to the first pulse count on the drive shaft, and simply goes backwards from the point where the tires hook up to determine these distances. The time from the "first movement" trigger to the inflection point where the tires hooked up is known because of the time stamping of the velocity values done by the present invention. This time, as well as the velocity and acceleration equations, are used for an equation to calculate the correct initial distance traveled.

In other words, according to the present invention, the method subtracts the error between the measured distance, which is artificially high if the tires are spinning, and the actual distance traveled. In other words, during wheel spin the vehicle does not travel as far as the PCM pulse counter indicates. The present invention according to an embodiment calculates the correct distance and then subtracts the error from all subsequent values of distance going down the track.

Once the vehicle is moving going down the track, the velocity curve is accurate all the way down the track until the driver lets off the throttle and the velocity drops and the acceleration drops, e.g. for a ¼ mile test when the driver passes 1320 feet. According to the method of the present invention, a numerical integration is done to get the distance and the numerical differentiation to get the acceleration of that velocity curve.

For a drag strip run, the times such as shown in the examples in FIGS. 27 and 28, can then be taken off the calculated curves, e.g., how long it took to get to an eighth of a mile, a quarter mile, etc. The drag strip print out, the timing slip print out, has the same data in the same order as would be obtained on an actual drag strip. That is, it is timed at 60 feet, timed at 330 feet, timed to ⅛ mile and timed to 1,000 feet and timed to a quarter mile and from the data and curves that has been developed, the velocity values are obtained that correspond to each of those times. Thus, the method has the advantage of calculating the correct distance from the sum of the two unknowns caused by wheel spin and the distance the vehicle travels before the first drive shaft pulse count is generated.

The steps up to this point as described above are summarized as follows: In a preferred embodiment, the accelerometer is used to start the clock (the first movement trigger) and so obtain a correct time line. The system then performs a mathematical inspection of velocity curves recorded from the PCM and smoothes the curves to find a point of inflection in the velocity (and/or any derivative of velocity) to establish the moment of "no wheel spin". The exact time from first movement to this point of no wheel spin is determined, and then the correct distance is determined by one of the methods described in further detail below.

According to a first method of corrected distance calculation, the method starts with a polynomial equation, and, using the values of smoothed velocity and calculated acceleration at the instant of time of "no wheel spin", along with the initial values of zero for the polynomial and all integrals and derivatives of the polynomial at time zero, solves for the co-efficients of the polynomials and all integrals and derivatives. The solved coefficients are inserted into any and all of the polynomial equations, including integrals and derivatives, and then either one of two methods is used to solve for the correct distance from time zero until the instant of no wheel spin: a direct calculation of distance can be made from the polynomial equation for distance, or by using the velocity equation with the derived coefficient values, and calculating each and every velocity value, from time zero to the instant of no wheel spin, the correct distance is obtained from a simple numerical integration of the velocity over that time. Implementing this method in a software program is well within the skill of one of ordinary skill in the art.

According to a second alternative method for calculating the corrected distance, instead of using polynomials to find the correct distance, a constant value for acceleration is used that yields a velocity curve which is a straight line starting at time zero with a value of zero, which rises in a straight line to meet the smoothed velocity curve with equal value at the instant of "no wheel spin". The resulting straight line velocity curve is integrated to get the distance equation, and either one of two alternative methods is used to solve for the correct distance from time zero until the instant of no wheel spin: a direct calculation of distance can be made from the directly from the equation for distance, or by calculating each and every velocity value, from time zero to the instant of no wheel spin, the correct distance is obtained from a simple numerical integration of the velocity over that time.

For the second alternative method, generally any straight line describing velocity or any derivative of velocity can be used to connect the zero time line, at any value, and not necessarily zero, to the time of "no wheel spin" line, so long as the velocity calculation equals the smoothed velocity data at that time, with no particular requirement that the derivatives of velocity must equal the value of the same derivative at that same "no wheel spin" time line. By integration, if necessary, the velocity and distance equations are derived, and either one of two methods is used to solve for the correct distance from time zero until the instant of no wheel spin: a direct calculation of distance can be made from the directly from the equation for distance, or by calculating each and every velocity value, from time zero to the instant of no wheel spin, the correct distance is obtained from a simple numerical integration of the velocity over that time.

It should be noted however, that the velocity curve, or line must always start at zero time with a value of zero velocity, but any and all derivatives can start at the same instant with any value, not necessarily zero.

With correct distance obtained by any of the above methods, the errors in the distance file that was calculated from the numerical integration of PCM velocity values can now be corrected. The distorted value for distance on file are replaced with the new corrected distance, and all Drag Strip and acceleration values can be accurately calculated and displayed.

The dynamometer program likewise depends on accuracy at low speeds in order to accurately calculate power and torque in that critical low speed range. Power and torque calculations, after wheel spin, are not affected by the two distance errors described above, only the low speed power and torque values are affected. The present invention has the advantage of providing a Dynamometer program that gives accurate results over the entire test including the critical low speed range.

The following is a more detailed description of the dynamometer feature of the present invention. After correcting the velocity and distance values, a numerical differentiation is performed on the smoothed velocity values to obtain the acceleration of the vehicle, and a file created on the same time line as distance and velocity.

Referring to the equations below, it can be seen that these values for velocity and acceleration of the vehicle are what is needed in order to calculate both horsepower and torque at the driving wheels, and if the losses from the flywheel to the road are known, the engine horsepower can be calculated and displayed. Lingenfelter Performance Engineering (LPE) estimates a 20% loss for automatic transmissions, and 13% loss for manual transmissions. In the art, these are very good values based on the extensive testing over the years by LPE. So, while different vehicles might deviate a little, one way or the other from these numbers, the LPE values are very close and will give good results for comparison testing, i.e., probably having less error than the average "working" dynamometer does.

The two terms in the calculation of driving wheel power and torque are first, from Force=Mass×Acceleration, converted in the Equations into terms of vehicle weight, tire diameter, and R.P.M. This part of the final equation is related to the force accelerating the vehicle.

The force opposing forward motion is F2=−Constant× V**2. It is the sum of all "resistances", rolling resistance of the tires, wind resistance, working fluids, etc. It is not necessary to separate them, or to try to measure or calculate them separately, because all these losses are directly proportional to the velocity squared. So, a coast down procedure described below enables determination of a deceleration curve, and calculation of the Constant for all resisting forces.

To insure accuracy, the Constant is calculated in one mph increments over at least 10 mph of clean coast down deceleration, and then each one is inspected. It is found that the calculations agree to less than 1% deviation, so they are all averaged to arrive at the best value to use.

Equations

A polynomial equation is written in the following form:

Value=$A*t**0+B*t+C*t**2+\ldots N*t**(N-1)$, where A, B, C, . . . N are constants, one asterisk signifies multiplication and two signifies exponentiation and integration is over time t.

The number of terms needed is equal to the number of unknown coefficients that need to be found, and that is equal to the number of boundary conditions to be satisfied.

Below is shown a 4 term polynomial equation. This equation is used for the numerical integration method (method two above) to calculate the correct distance value. The equation is solved for 4 constants in terms of 4 boundary conditions, the velocity and acceleration at time equal zero, and the velocity and acceleration at time of zero wheel spin.

$V=A+B*t+C*t**2+D*t**3$ $A=B+2*C*t+3*D*t**2$ and, at t=0, both V (velocity) and A (acceleration) are also equal to 0, so by inspection of the two equations, the first two constants, A and B, are equal to 0, leaving only two terms in the two equations:

$V=C*t**2+D*t**3$ $A=2*C*t+3*D*t**2$

The exponents can be changed and more terms can be added to account for many more boundary conditions. For example, adding another term if it is desired to set the initial value of distance to zero, add two more if it is desired to set boundary conditions for jerk (the derivative of acceleration), and so on. Changing the number of terms, and/or the value of the exponents does not change the methodology.

Below is the full set of equations for four terms, simple linear exponents, that are used in the numerical integration method.

Assume the following polynomials describe the raw data where:

V=velocity (fps)
A=acceleration (fps$^2$)
t=time (sec)
C, D=coefficients $V=Ct^2+Dt^3$: Velocity equation      1)

$A=2Ct+3Dt^2$: Acceleration equation      2)

Solving 1 for C yields:

$$C = \frac{V - Dt^3}{t^2} \quad\quad 3)$$

Substituting 3 into 2 and solving for D:

$$D = \frac{At - 2V}{t^3} \quad\quad 4)$$

Raw data is Velocity vs. time. The raw V is smoothed using:
n=sample index $$V_{sm} = \frac{V_{n-2} + V_{n-1} + V_n + V_{n+1} + V_{n+2}}{5} \quad\quad 5)$$

Equation 5 may be applied successively until the desired smoothness is achieved.

Using the smoothed velocity data, the acceleration is calculated by taking the numerical derivative at each velocity point using Equation (6):

$$A_n = \frac{\frac{V_n - V_{n-1}}{t_n - t_{n-1}} + \frac{V_{n+1} - V_n}{t_{n+1} - t_n}}{2} \quad 6)$$

This now gives acceleration and velocity curves.

Wheel spin is corrected using this data. The first velocity point that does not indicate wheel-spin is determined. C & D are calculated using methods described above for this velocity point. The erroneous data points for velocity are filled in using the calculated values for C and D in Equation 1.

The distance is then calculated using the corrected velocity data. The data is numerically integrated to yield distance, where:

$$d = dist \quad 7)$$

$$d = \sum_0^n \left(\frac{V_n + V_{n-1}}{2}\right) \times (t_n - t_{n-1})$$

Figure 39:
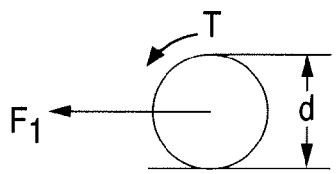
FIG. 39 shows a diagram illustrating drive force F1, torque T and wheel diameter d.
Figure 40:
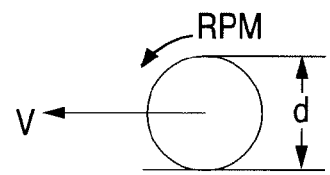
FIG. 40 shows a diagram illustrating vehicle velocity V, RPM, and wheel diameter d.
Figure 41:
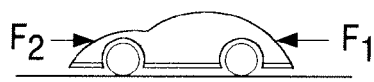
FIG. 41 shows a diagram illustrating drive force F1 and drag losses F2.

Horsepower and Torque Calculations and Derivations:

FIGS. 39-41 are diagrams graphically illustrating some of the variables for the equations below. FIG. 39 illustrates drive force $F_1$, torque T and wheel diameter d. FIG. 40 illustrates vehicle velocity V, RPM, and wheel diameter d. FIG. 41 depicts drive force F1 and drag losses F2. For the equations below:

T=torque
V=vehicle velocity (fps)
d=wheel diameter (ft)
$F_1$=drive force
$F_2$=drag losses
$C_L$=loss coefficient
HP=horsepower
m=vehicle mass
a=vehicle acceleration
g=acceleration of gravity=32.9 f/s²
W=vehicle weight
Solve for $F_1$ $$T = F_1 \times \frac{d}{2} \quad 1)$$

$$V = \left(\frac{Rev}{\min}\right) \times \left(\frac{\min}{60 \sec}\right) \times \left(\frac{\pi \times d}{Rev}\right), \quad 2)$$

$$V = \frac{RPM \times \pi \times d}{60}, \quad 2a)$$

$$RPM = \frac{60 \times V}{\pi \times d} \quad 2b)$$

$$HP = \frac{T \times RPM}{5252}, \quad 3)$$

$$HP = \frac{F \times V}{550}, \quad 3a)$$

$$F_1 = \frac{550 \times HP}{V} \quad 3b)$$

Calculation of losses, Solve for $F_2$:

$$F_2 = (C_L \times V^2) \quad 4)$$

$$\sum F = m \times a \quad 5)$$

$$m \times a = F_1 - F_2 \quad 5a)$$

$$m \times a = \frac{550 \times HP}{V} - (C_L \times V^2) \quad 5b)$$

$$HP = \frac{V}{550}((m \times a) + (C_L \times V^2)) \quad 5c)$$

$$W = m \times g \quad 6)$$

$$m = \frac{W}{g} \quad 6b)$$

Substituting 6b into 5c yields:

$$HP = \left(\frac{V}{550}\right) \times \left(\left(\left(\frac{W}{g}\right) \times a\right) + (C_L \times v^2)\right) \quad 7)$$

Coast Down Calculation

A coast down calculation is required to measure actual resistance to all parasitic motion losses, such as wind resistance, tire rolling resistance, and all gear and bearing drag. All are a function of vehicle speed squared, so a simple coast down test can be performed that is accurate for that vehicle, equipped with whatever tires, mirrors, aftermarket aerodynamic "wings", lowered suspensions, etc. This coast down test gives a drag coefficient that accounts for all such parasitic losses. At any speed, the motion losses in total are equal to this experimentally determined coefficient multiplied by the Vehicle Speed "squared". No other prior art consumer product or shop tool is known that provides this feature.

The engineering approach to calculate the coefficient of drag without a wind tunnel is to use the cross sectional area of the car and then the coefficient of drag which is a reflection of the resistance of that particular shape body going through the air. Now coefficient of drag of a vehicle is really a misnomer because it implies wind resistance, but there are also the rolling resistances of the tires, losses due to the transmission and gears, etc. Interestingly enough though, there is a coefficient of drag of the transmission gears, and a coefficient of drag of the rear axel gears, and a coefficient of drag of all bearings, coefficient of drag of rear tires as they flex and consume energy and coefficient of drag of the aerodynamics and that would be hard for an engineering department to define for each and every car. However, all of those coefficients can be summed up in brackets and then multiplied by simply the velocity squared, because each and every one of these factors individually is a function of the velocity squared times the co-efficient. The present invention provides an empirical technique for measuring the total motion loss independent of whatever rear view mirrors, or wings, or tires, or lowered suspensions, or other non-stock modifications exist on the vehicle, all affect the coefficient of drag. Known methods require the driver to look up his or her vehicle's cross sectional area to determine the coefficient of drag for your vehicle.

The coast down method for calculating the total motion losses of a vehicle wherein the losses are proportional to the square of the velocity of the vehicle, including the steps of a) initiating a first run by causing the vehicle to move at a speed of about 60 miles per hour along a path on a track of known slope; b) acquiring the vehicle's speed via an onboard diagnostic port in the vehicle; c) causing the vehicle to shift to neutral gear so as to allow the vehicle to coast down; d) acquiring the vehicle's speed via an onboard diagnostic port at predetermined intervals during the coast down; and e) allowing the vehicle to coast down until its speed is about 50 miles per hour; f) repeating steps a) to e) for a second run substantially following the path of the first run; g) comparing speeds acquired in the first and second runs; h) calculating the total motion loss from the acquired speeds if the speeds at the predetermined intervals obtained during the first run and second run are substantially consistent; i) repeating steps a) to e) for successive runs if the acquired speeds at the predetermined intervals for the prior two runs are not substantially consistent until the acquired speeds at the predetermined intervals are substantially consistent between successive runs; and j) calculating the total motion loss from the substantially consistent acquired speeds at the predetermined intervals.

So, prior to every run, the user will see the various values and is asked by the computer system of the present invention if there is anything that has been changed. If the user has changes for any of these particular variables, the user will need to do another coast down and obtain a new coefficient of drag.

Calculation of drag coefficient $C_L$ from coast-down data where:
$V_1$=initial velocity
$V_2$=coasting velocity after time
t=elapsed time between $V_1$ and $V_2$
$C_L$=loss coefficient
m=vehicle mass (equ 6b)
$a_d$=coastdown acceleration (deceleration)

$$a_d = \frac{V_1 - V_2}{t_1 - t_2} \qquad 8)$$

$$F_2 = m \times a_d \qquad 9)$$

also from equation 4;

$$F_2 = (C_L \times V^2) \qquad 9a)$$

$$C_L = \frac{m \times a_d}{V^2} \qquad 10)$$

Having disclosed exemplary embodiments, modifications and variations may be made to the disclosed embodiments while remaining within the scope of the invention as described by the following claims.

What is claimed is:

1. A method for determining the time it takes for a vehicle to travel from a standing start to a selected distance, wherein said method corrects for errors in the velocity values generated by the vehicle's onboard diagnostics system, comprising the steps of:
 detecting the start time of vehicle travel independent of the onboard diagnostics system;
 storing the velocity values received from the onboard diagnostics system;
 determining and storing for each velocity value the time period from the start time to when each velocity value is received;
 generating a velocity curve from said velocity values; and
 integrating the velocity values to calculate the time of travel from the start time to the selected distance.

2. The method of claim 1, wherein the errors in the velocity values include errors resulting from vehicle wheel spin, and wherein the step of generating a velocity curve comprises the steps of:
 determining the time that an inflection point occurs in the velocity values output by the onboard diagnostics system indicative of the end of the wheel spin state;
 interpolating the velocity and acceleration values from the inflection point back in time to the start time.

3. The method of claim 1, where the start time is detected as a function of detection of the first movement of the vehicle as part of a test run.

4. The method of claim 1, wherein the start time is detected using an accelerometer.

5. The method of claim 1, wherein the start time is detected using a mercury switch.

6. The method of claim 1, wherein the start time is detected as a function of detection of movement of an accelerator pedal of the vehicle.

7. The method of claim 1, wherein the start time is detected as a function of detection of movement of a brake pedal of the vehicle.

8. The method of claim 1, wherein the vehicle has a manual transmission and the start time is detected as a function of clutch release.

9. The method of claim 1, further comprising the step of calculating and displaying the times to reach one or more predetermined speeds as a function of at least one of the calculated distances, velocity curve values, and acceleration curve values.

10. The method of claim 1, further comprising the step of calculating and displaying the times to reach one or more predetermined distances as a function of at least one of the calculated distances, velocity curve values, and acceleration curve values.

11. The method of claim 1, further comprising the step of calculating and displaying engine horsepower as a function of at least one of the calculated distances, velocity curve values, and acceleration curve values.

12. The method of claim 1, further comprising the step of calculating and displaying engine torque as a function of at least one of the calculated distances, velocity curve values, and acceleration curve values.

13. A method for calculating distances traveled associated with driving a vehicle in a test run from a standing start over a selected distance, wherein said method corrects for velocity errors in the data obtained from the onboard diagnostics system (OBD) arising from wheel spin, including the steps of:
 detecting the start time of first movement of vehicle in test run;
 reading velocity values from the OBD;
 time stamping said velocity values using a clock,
 generating a velocity curve from said velocity values and time stamps;
 smoothing said velocity curve so as to determine a point of inflection in the velocity indicative of a termination of wheel spin;
 determining elapsed time from the start time to the inflection point; and
 interpolating the velocity values to determine the correct distance from the start time to the inflection point.

14. A method for determining the time it takes for a vehicle to travel from a standing start to a selected distance, wherein the determination corrects for errors in the velocity values generated by the vehicle's onboard diagnostics system, wherein the errors in the velocity values include errors arising from wheel spin, comprising the steps of:

detecting the start time of vehicle travel independent of the onboard diagnostics system;

time stamping each of the velocity values generated by the vehicle's onboard diagnostics system;

determine an inflection point in the velocity values output by the onboard diagnostics system indicative of the end of the wheel spin state;

determining the time that the inflection point occurs based on the time stamp of the velocity value at the inflection point;

generating a velocity curve from the velocity values from the inflection point forward in time;

integrating the velocity values of the generated velocity curve from the inflection point forward in time to calculate the corrected distance from the inflection point forward;

interpolating the velocity values from the start time to the inflection point such that the interpolated velocity curve connects to the generated velocity curve at the inflection point; and integrating the velocity values of the interpolated velocity curve to calculate the corrected distance from the start time to the inflection point.

15. The method of claim 14, wherein the corrected velocity curve is a straight line from the start time to connect to the generated velocity curve at the inflection point.

16. The method of claim 14, wherein the corrected velocity curve is based on a velocity polynomial equation having coefficients solved based on the value of the generated velocity curve and calculated acceleration at the inflection point along with an initial value of zero for the polynomial equation at the start time, wherein the solved coefficients are inserted into the velocity polynomial equation.

17. The method of claim 16, wherein the corrected distance is determined from integration of the velocity polynomial equation that includes the solved coefficients.

18. The method of claim 16, wherein the corrected distance is determined from a polynomial equation for distance that includes the solved coefficients.

19. An electronic portable device for determining the time it takes for a vehicle to travel from a standing start to a selected distance, wherein the device corrects for errors in the velocity values generated by the vehicle's onboard diagnostics system, comprising:

an input/output port for coupling said device to said diagnostic port for accessing the onboard diagnostic system and the engine computer;

a detector for detecting the start time of vehicle travel independent of the onboard diagnostics system;

a microcontroller operative for determining for each velocity value the time period from the start time to when each velocity value is received, for generating a velocity curve from said velocity values; and for integrating the velocity values to calculate the time of travel from the start time to the selected distance;

a memory for providing storage in said device for velocity values received from the onboard diagnostics system and providing storage in said device, for each velocity value, the time period from the start time to when each velocity value is received; and a touch screen display for enabling user control of device operations.

\* \* \* \* \*